US012557897B2

(12) United States Patent
Hobbs

(10) Patent No.: US 12,557,897 B2
(45) Date of Patent: Feb. 24, 2026

(54) PORTABLE STAND

(71) Applicant: Dustin Hobbs, Clackamas, OR (US)

(72) Inventor: Dustin Hobbs, Clackamas, OR (US)

( * ) Notice: Subject to any disclaimer, the term of this patent is extended or adjusted under 35 U.S.C. 154(b) by 0 days.

(21) Appl. No.: 18/406,087

(22) Filed: Jan. 5, 2024

(65) Prior Publication Data

US 2024/0225243 A1     Jul. 11, 2024

Related U.S. Application Data

(60) Provisional application No. 63/478,616, filed on Jan. 5, 2023.

(51) Int. Cl.
| | |
|---|---|
| *F16M 11/00* | (2006.01) |
| *A45F 3/00* | (2006.01) |
| *F16M 11/24* | (2006.01) |

(52) U.S. Cl.
CPC ............ *A45F 3/00* (2013.01); *F16M 11/242* (2013.01); *A45F 2003/001* (2013.01); *A45F 2003/003* (2013.01)

(58) Field of Classification Search
None
See application file for complete search history.

(56) References Cited

U.S. PATENT DOCUMENTS

| | | | | |
|---|---|---|---|---|
| 4,688,657 | A * | 8/1987 | Erickson .................. | A62B 1/00 |
| | | | | 182/7 |
| 6,533,135 | B1 * | 3/2003 | Ford ...................... | B66C 19/02 |
| | | | | 104/126 |
| 10,577,846 | B2 | 3/2020 | O'Brien | |
| 11,434,117 | B2 * | 9/2022 | Knight, III ............ | B66F 7/0666 |
| 2023/0243614 | A1 * | 8/2023 | Landis ................... | F41A 23/08 |
| | | | | 42/94 |

* cited by examiner

*Primary Examiner* — Steven M Marsh
(74) *Attorney, Agent, or Firm* — Mark E. Beatty; Rylander & Associates P.C.

(57) ABSTRACT

A portable stand includes a rigid frame portion, an actuator portion synchronously coupled to a transfer shaft, a plurality of rotatable leg assemblies, a plurality of transfer shaft pulleys corresponding to the respective leg assemblies, and a plurality of leg flexible connectors synchronously coupling the respective leg assemblies to the transfer shaft through the transfer shaft pulleys. A portable stand may include a linear actuator coupled to a transfer shaft by a leg pull cam, and the transfer shaft synchronously coupled to a plurality of rotatable leg assemblies by a plurality of corresponding transfer shaft pulleys acting on corresponding flexible leg connectors.

19 Claims, 45 Drawing Sheets

PORTABLE STAND

CROSS-REFERENCE TO RELATED APPLICATION

This application is a nonprovisional of and claims priority to co-pending U.S. Provisional Patent Application Ser. No. 63/478,616 filed Jan. 5, 2023, which is herein incorporated by reference in its entirety.

FIELD OF THE INVENTION

The present invention relates to portable collapsible stand apparatus.

BACKGROUND

Bags, backpacks, equipment cases and other carriers are used to carry a wide variety of things. When a person wants to get something out or put something into a bag, they generally must set the bag down. A table or chair is a convenient option as it allows someone to reach into the bag at a standing height. When an elevated surface is not available the bag is generally set onto the ground. There are many disadvantages to setting a bag on the ground. The person must bend over or kneel to reach inside the bag. Often the bottom of the bag is set on ground that is very dirty or wet, inevitably getting the bottom of the bag dirty or wet. When a person picks up the bag off the ground, they are forced to bend over and lift it a long way, putting stress on their back and arms.

Therefore, what is needed is a device that easily elevates a bag or equipment to overcome the above-mentioned disadvantages, without requiring bending or stooping, and providing a stable platform to access the load. The device should be light weight and operable with one hand, and easily return to a stowed position.

SUMMARY AND ADVANTAGES

A portable stand, in a first version, may include a frame, an actuator connected to the frame, a transfer shaft, one or more leg assemblies rotatable from stowed positions to deployed positions and connected to the frame, a transfer pulley corresponding to each of the leg assemblies mounted concentrically on and rotatable with the transfer shaft, and leg flexible connectors synchronously coupling the leg assemblies to the transfer shaft by their corresponding transfer pulleys. The actuator includes an actuator pulley synchronously coupled to a transfer shaft actuator gear, and manual pull operator operably coupled to the actuator pulley. The transfer shaft actuator gear is coupled to and drives the transfer shaft.

Each leg assembly includes a leg hinge portion coupled to the frame, a leg shaft coupled to the leg hinge portion, a leg bias spring inside the leg shaft, a leg bias spring holder and a leg bias spring connector. Each leg hinge portion is synchronously coupled to the transfer shaft by a flexible leg connector, such as a cable or strap or fish tape or chain, such that rotation of the transfer shaft causes the leg assemblies to rotate as well. The leg bias spring connector is connected to the frame at one end and to the bias spring holder at the other end, routing around the leg hinge into the leg shaft interior and through the bias spring. When the leg assembly rotates from the stowed position to the deployed position due to the actuator gear and transfer shaft rotation, the bias spring holder, being anchored to the frame by the bias spring connector over the leg hinge, compresses the bias spring as the leg moves. When the actuator is released to return to the stowed position, the bias spring pushes against the bias spring holder causing the leg assembly to rotate back to the stowed position.

In an alternative version of a portable stand, the actuator includes a manual pull extending slidably within an actuator case and coupled to a flexible connector. The actuator flexible connector is operably coupled to a transfer shaft over a leg pull cam mounted eccentrically to and rotatable with the transfer shaft. The transfer shaft is synchronously coupled to leg assemblies by corresponding transfer pulleys as in the first version. The eccentrically mounted leg pull cam provides a long lever arm to fully deploy the leg assemblies using a partial rotation, while creating a low profile when in the stowed position.

A portable stand may be integrated into a bag, pack or other equipment, or may be removably couplable to a bag, pack or other equipment with selectively engageable connectors, or may simply provide a load surface, like a table.

A portable stand may include an actuator lock or may simply use the weight of the frame and load to hold the legs in the deployed position. An actuator lock may include a spring-biased lever arm selectively engageable against a detent on the actuator pulley or may engage directly against the teeth of an actuator gear.

The portable stand of the present invention presents numerous advantages, including: (1) providing easier ergonomic access to a bag, case or other carrier; (2) providing ability to keep loads off the ground or floor; (3) providing compact and lightweight stand easily deployable with one hand; (4) providing a stowable stand that can be integrated into a bag, pack or case or which may be removably attachable to a bag, pack or case.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

REFERENCE NUMBERS USED IN DRAWINGS

Figure 1:
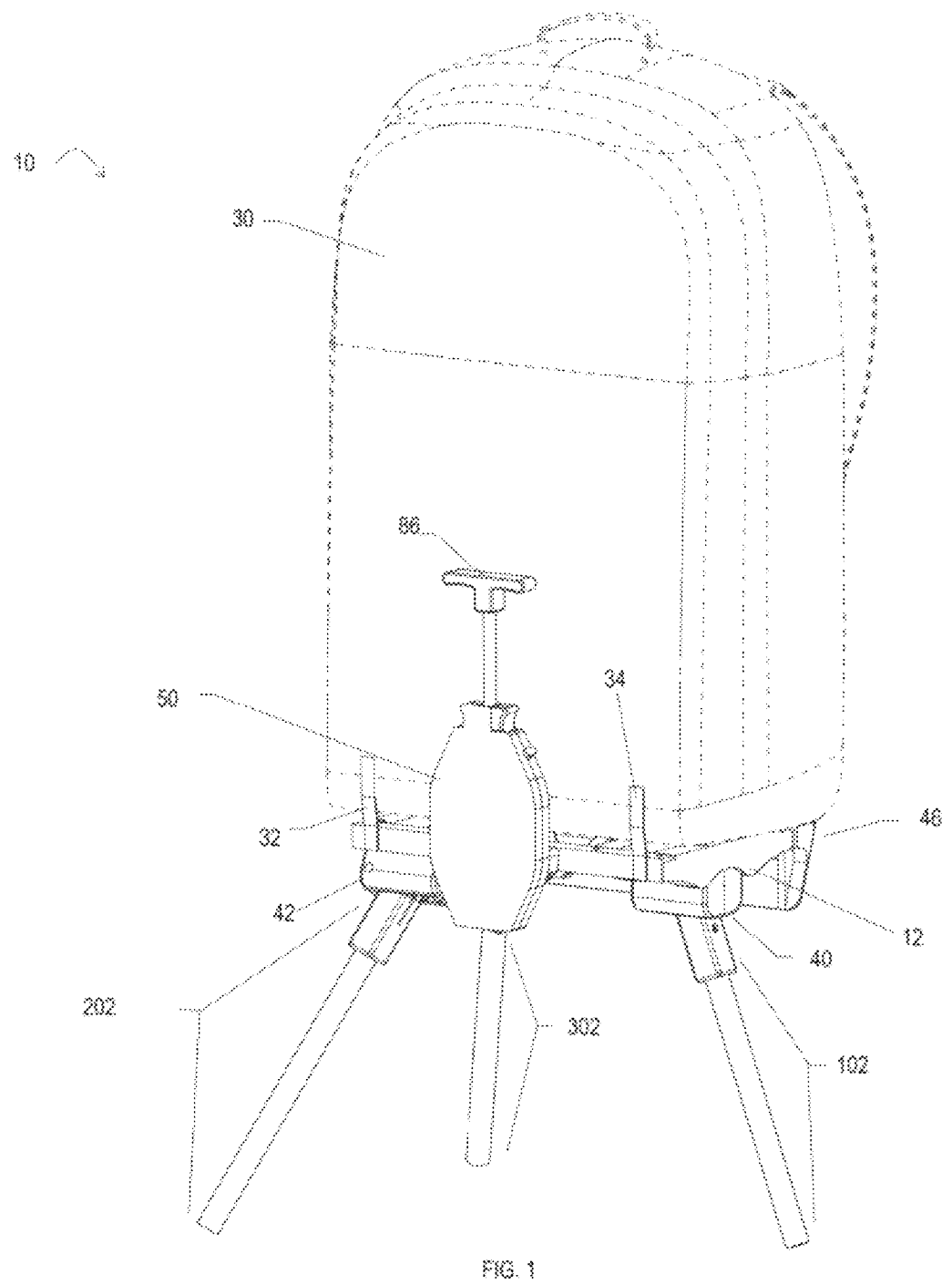
FIG. 1 shows a perspective view of a first embodiment, with legs deployed and a load.
Figure 2:
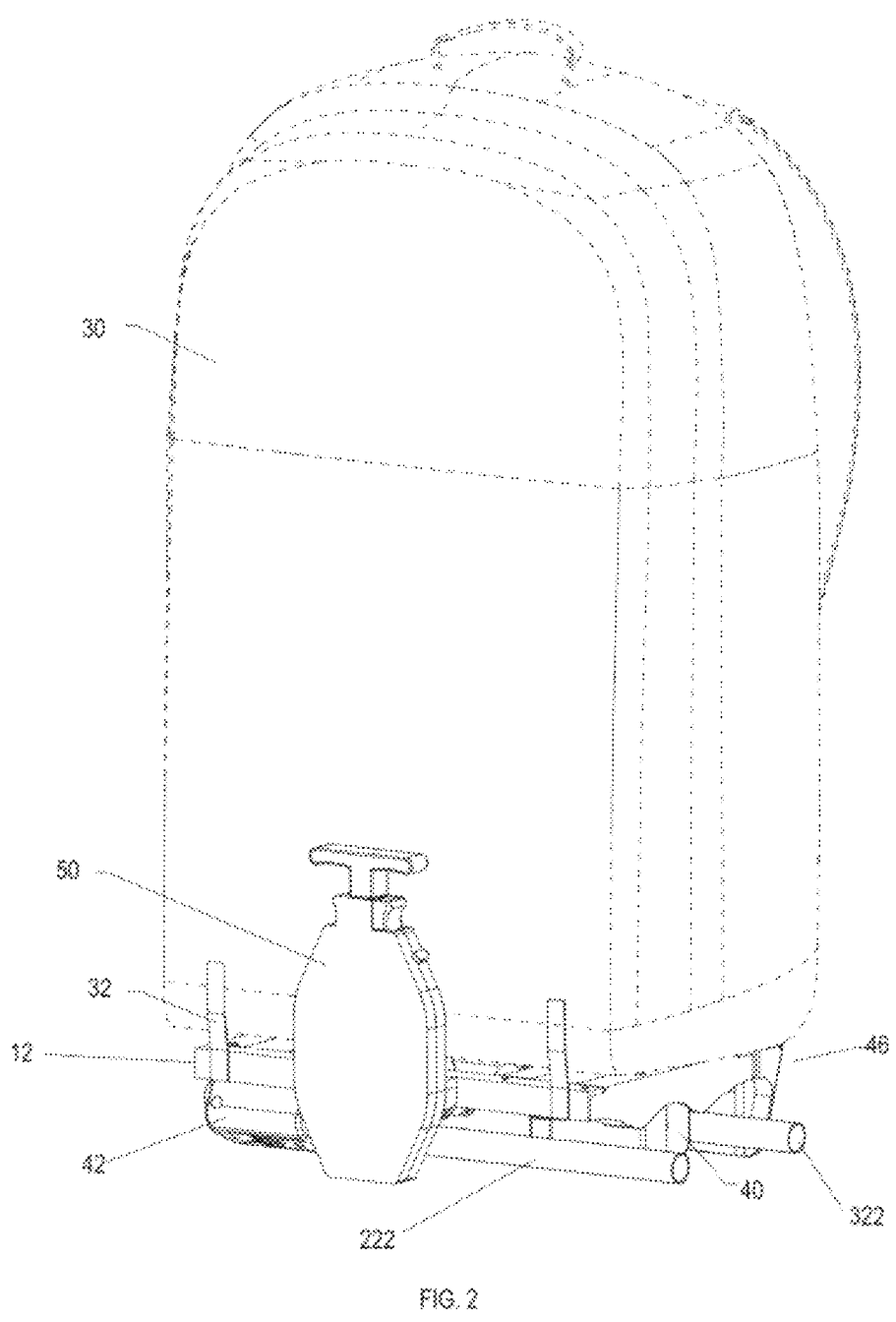
FIG. 2 shows a perspective view of a first embodiment, with legs stowed and a load/bag.
Figure 3:
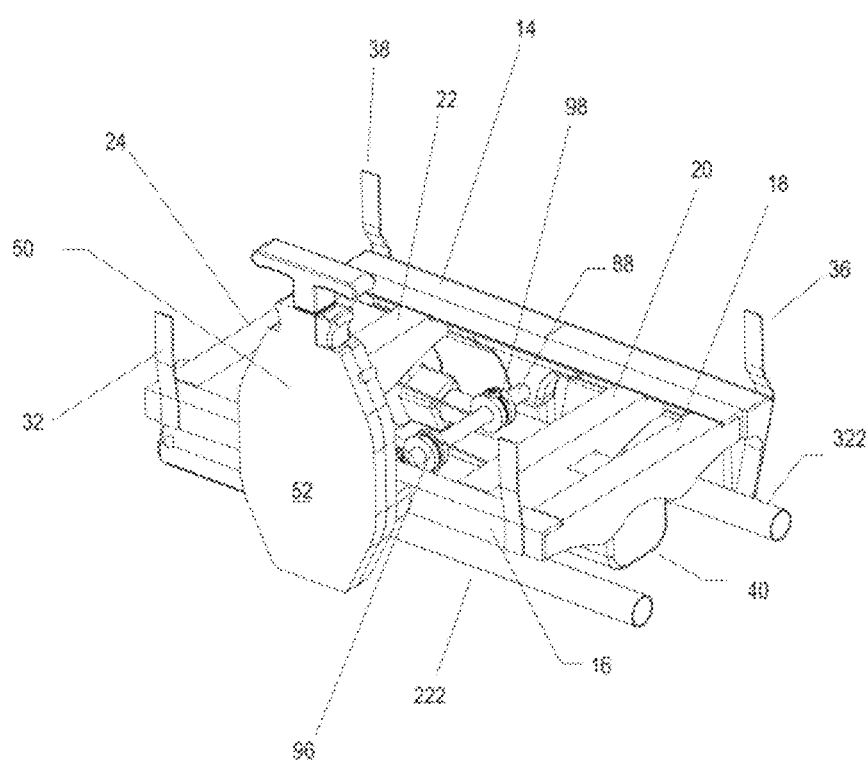
FIG. 3 shows a perspective view of a first embodiment, legs stowed.
Figure 4:
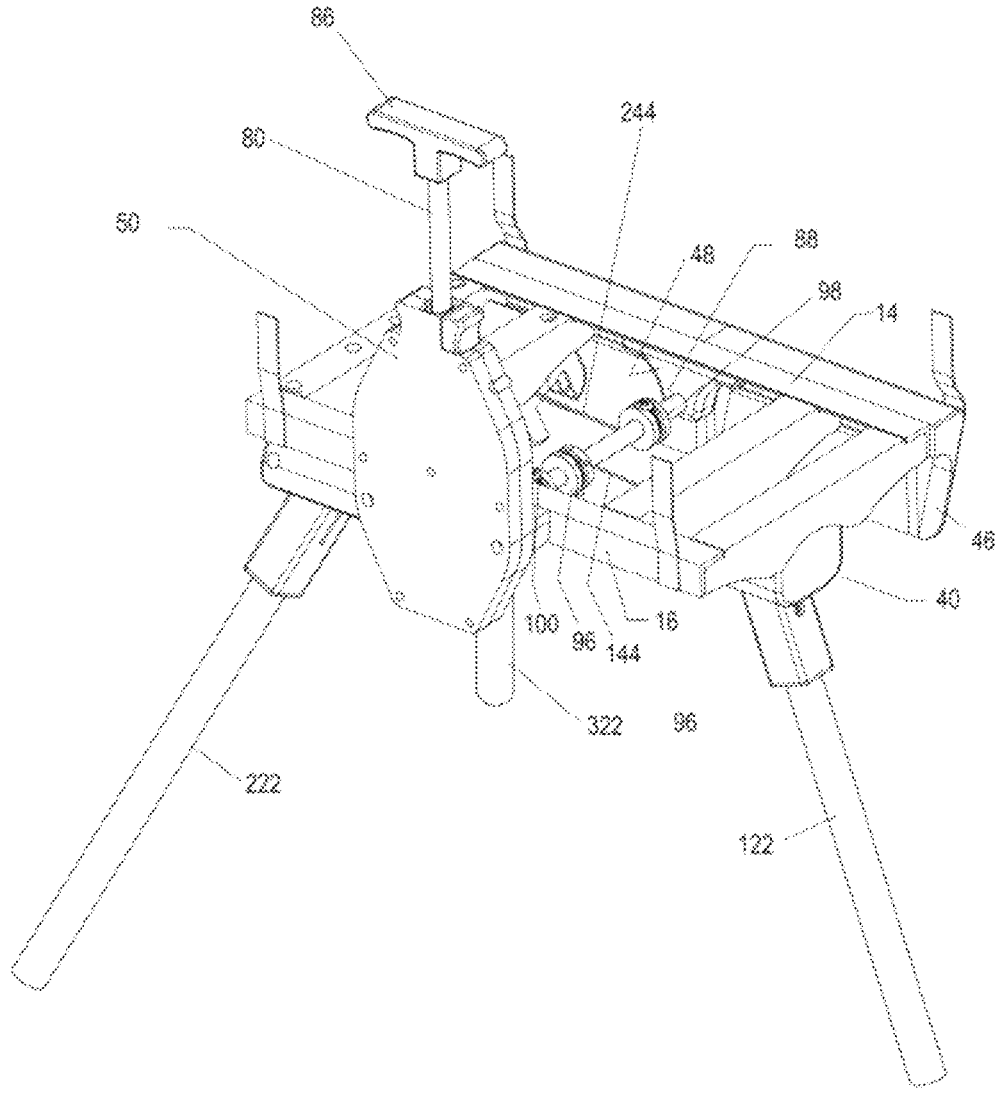
FIG. 4 shows a perspective view of a first embodiment, legs deployed.
Figure 5:
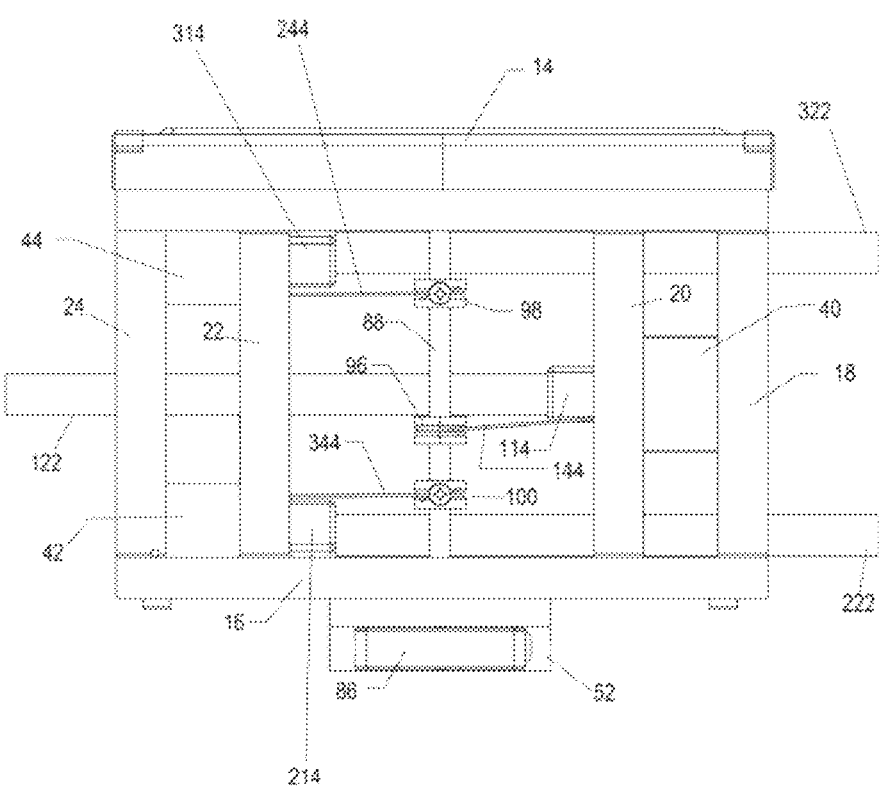
FIG. 5 shows a top view of a first embodiment, legs stowed.
Figure 6:
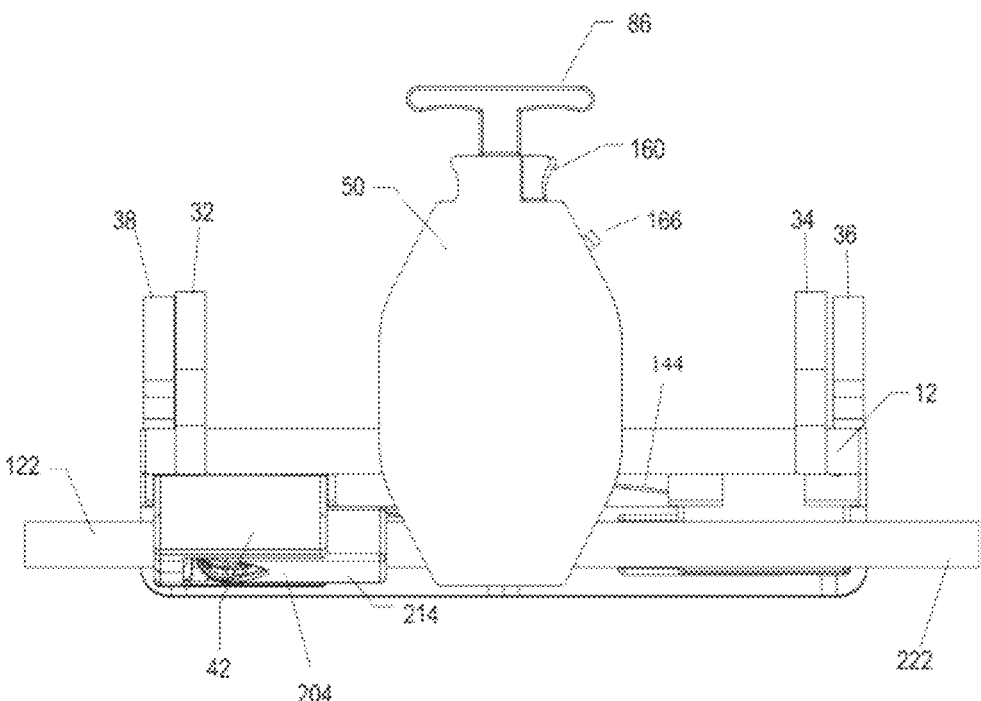
FIG. 6 shows a back side view of a first embodiment, legs stowed.
Figure 7:
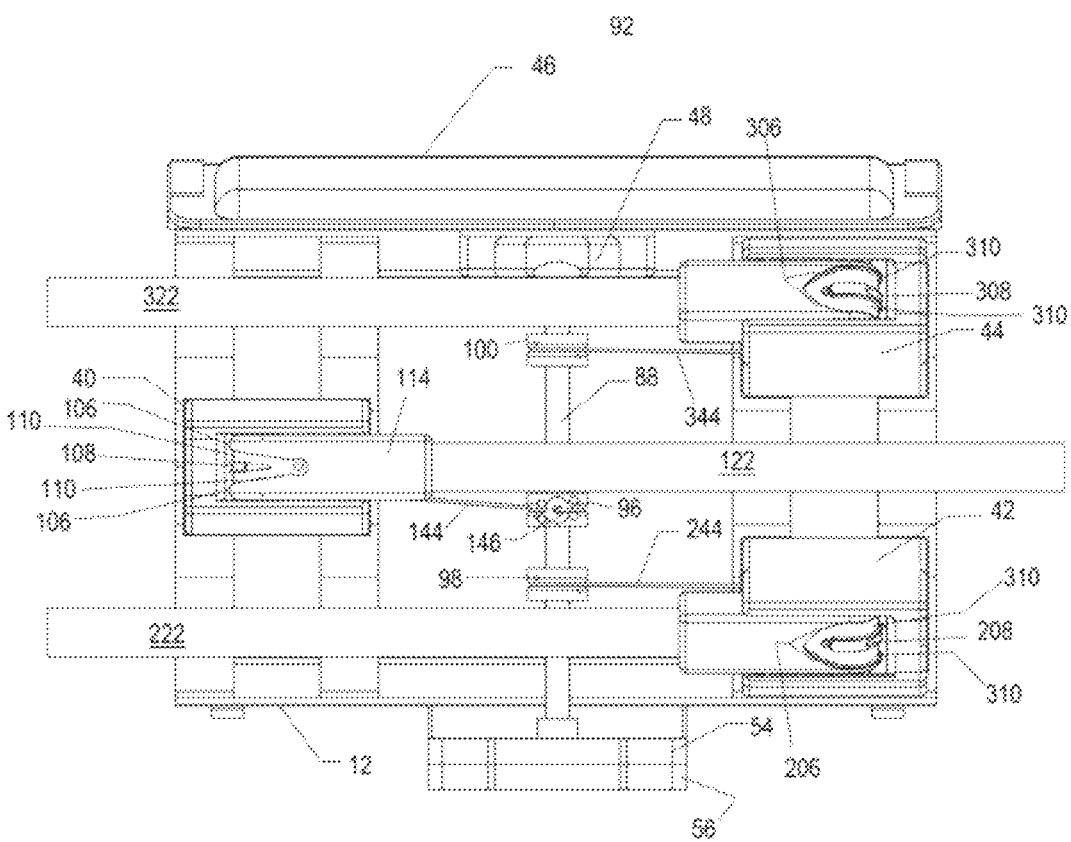
FIG. 7 shows a bottom view of a first embodiment, legs stowed.
Figure 8:
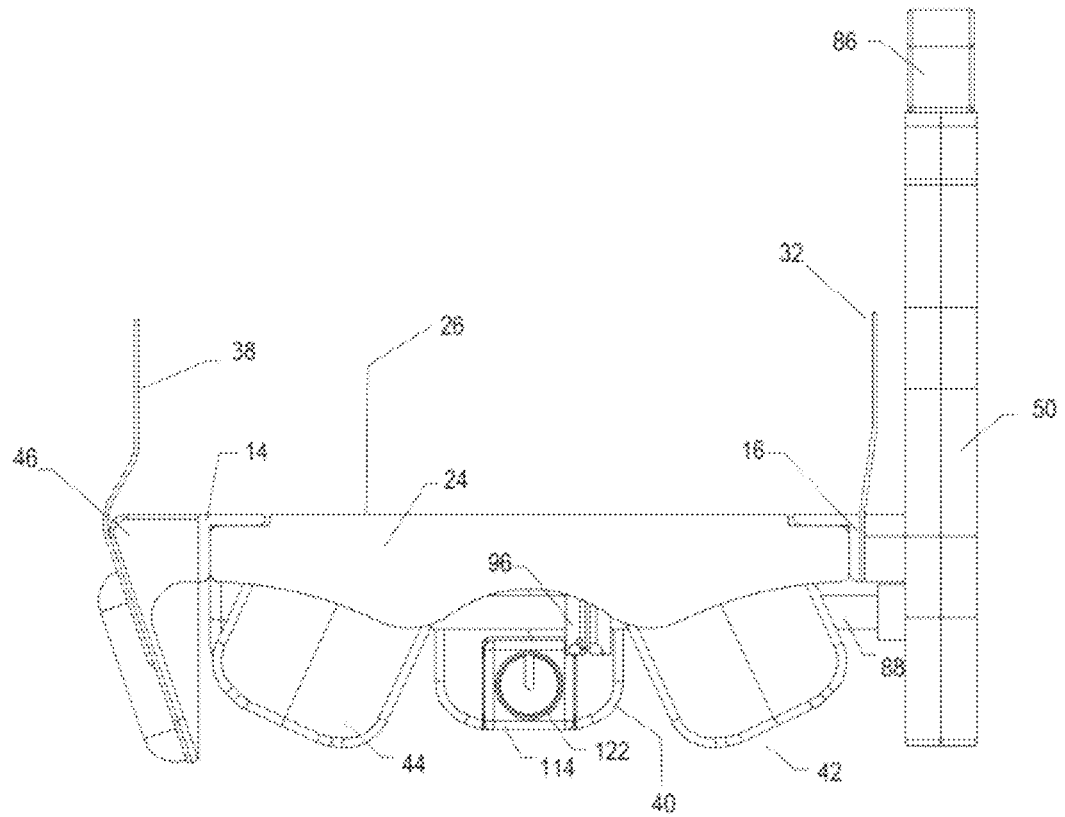
FIG. 8 shows a side view of a first embodiment, legs stowed.
Figure 9:
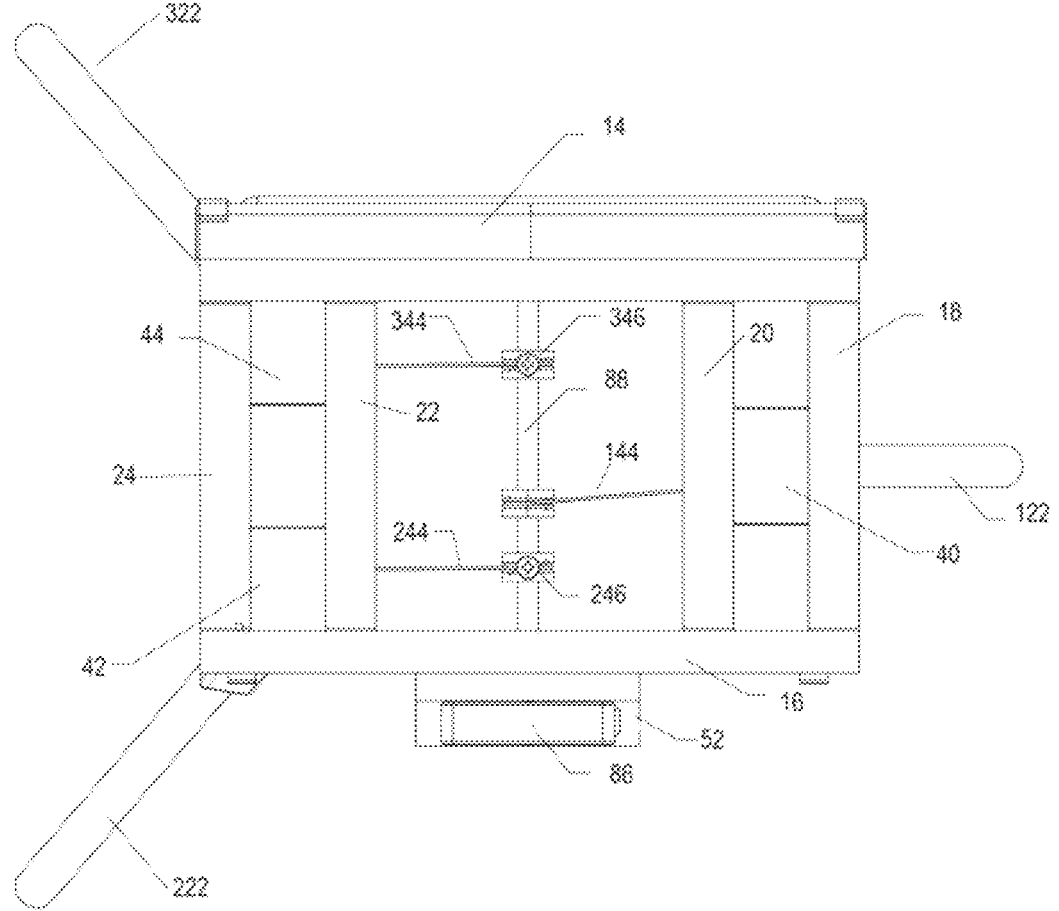
FIG. 9 shows a bottom view of a first embodiment, legs deployed.
Figure 10:
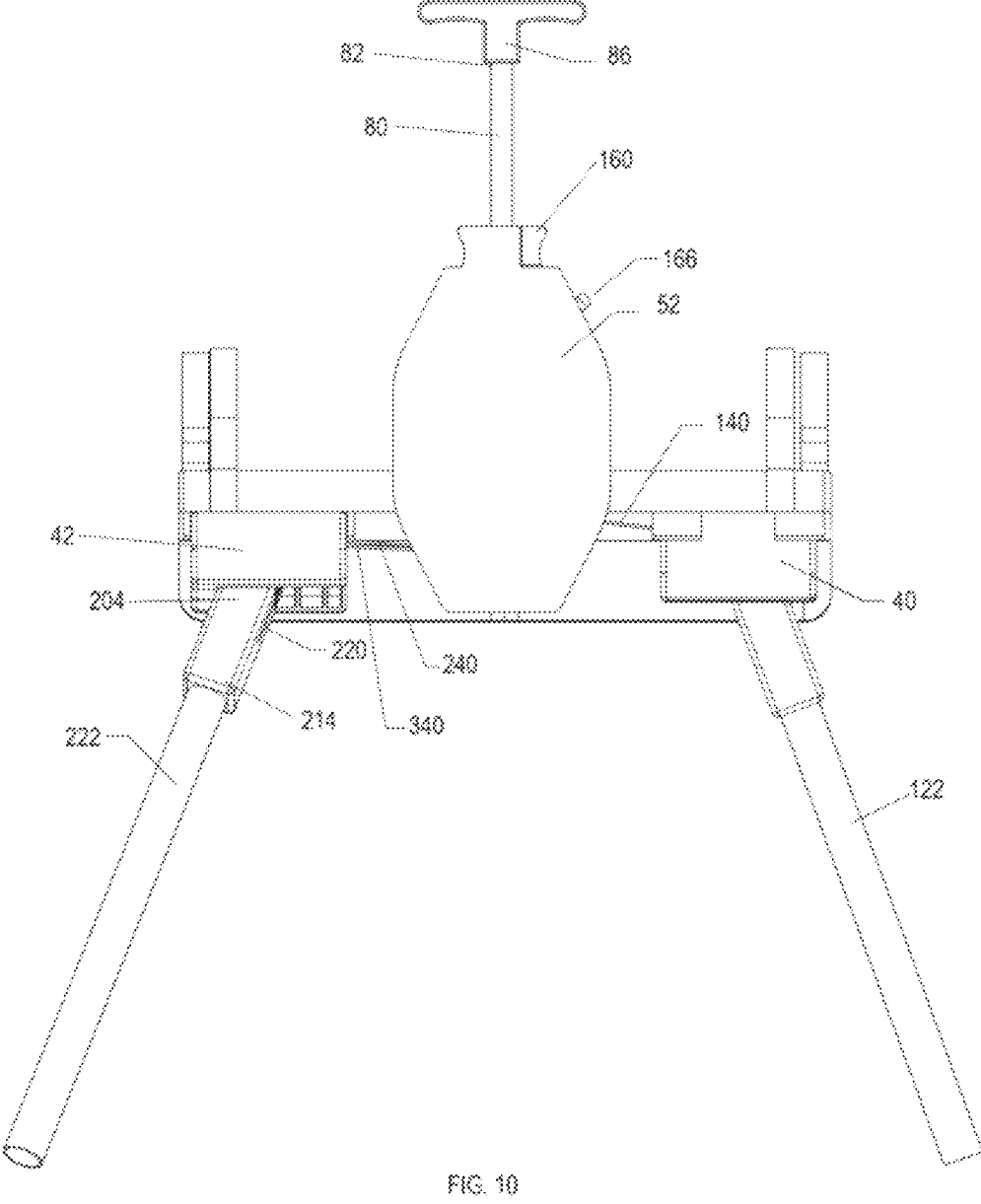
FIG. 10 shows a backside view of a first embodiment, legs deployed.
Figure 11:
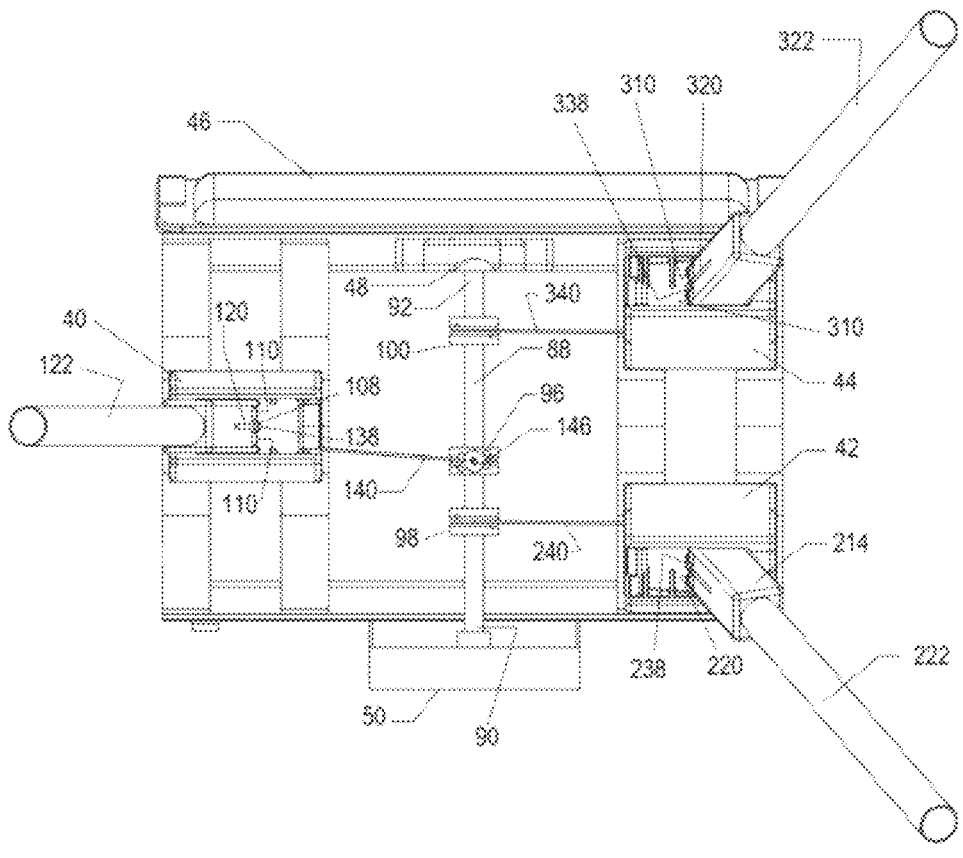
FIG. 11 shows a bottom side view of a first embodiment, legs deployed.
Figure 12:
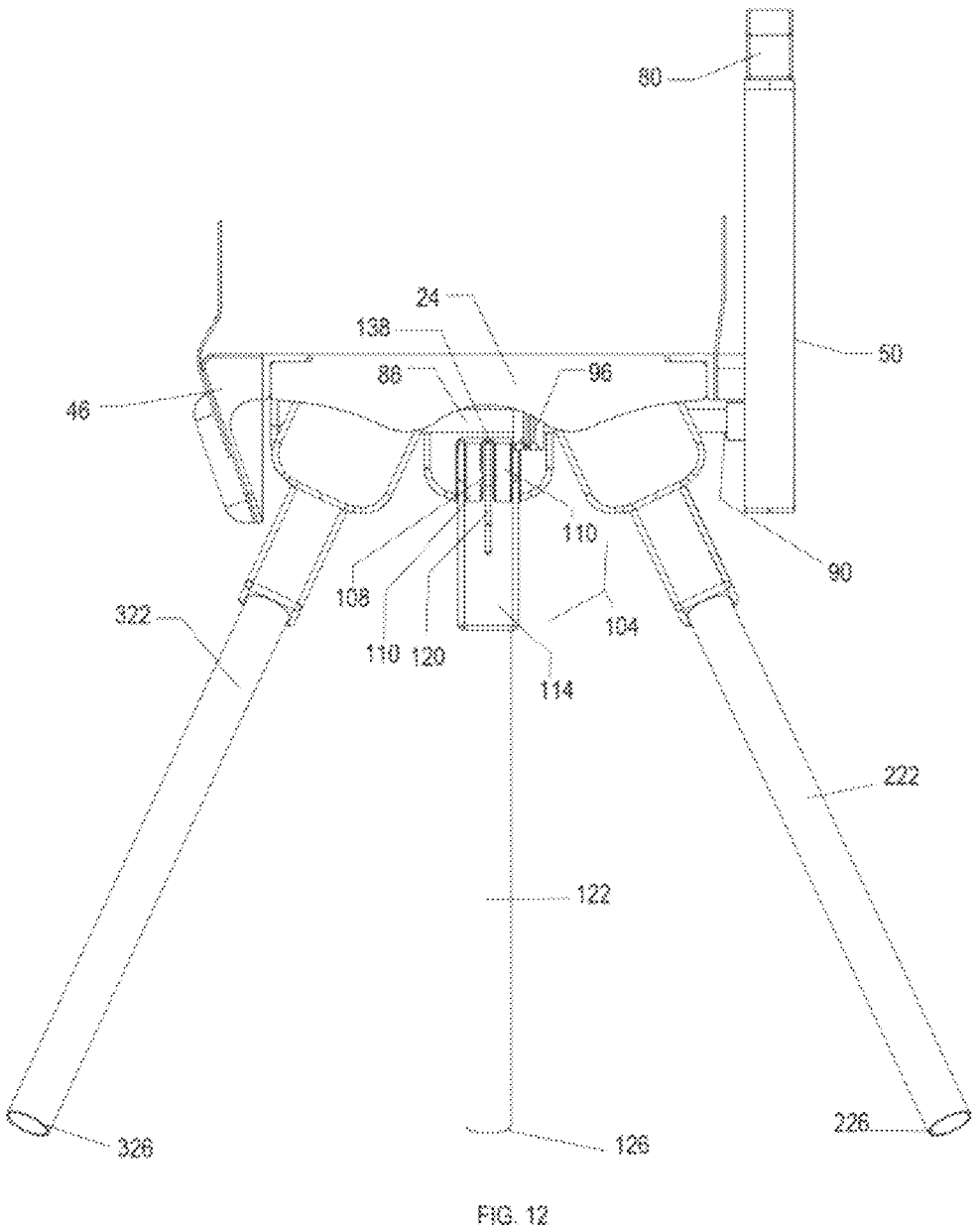
FIG. 12 shows side view of a first embodiment, legs deployed.
Figure 13:
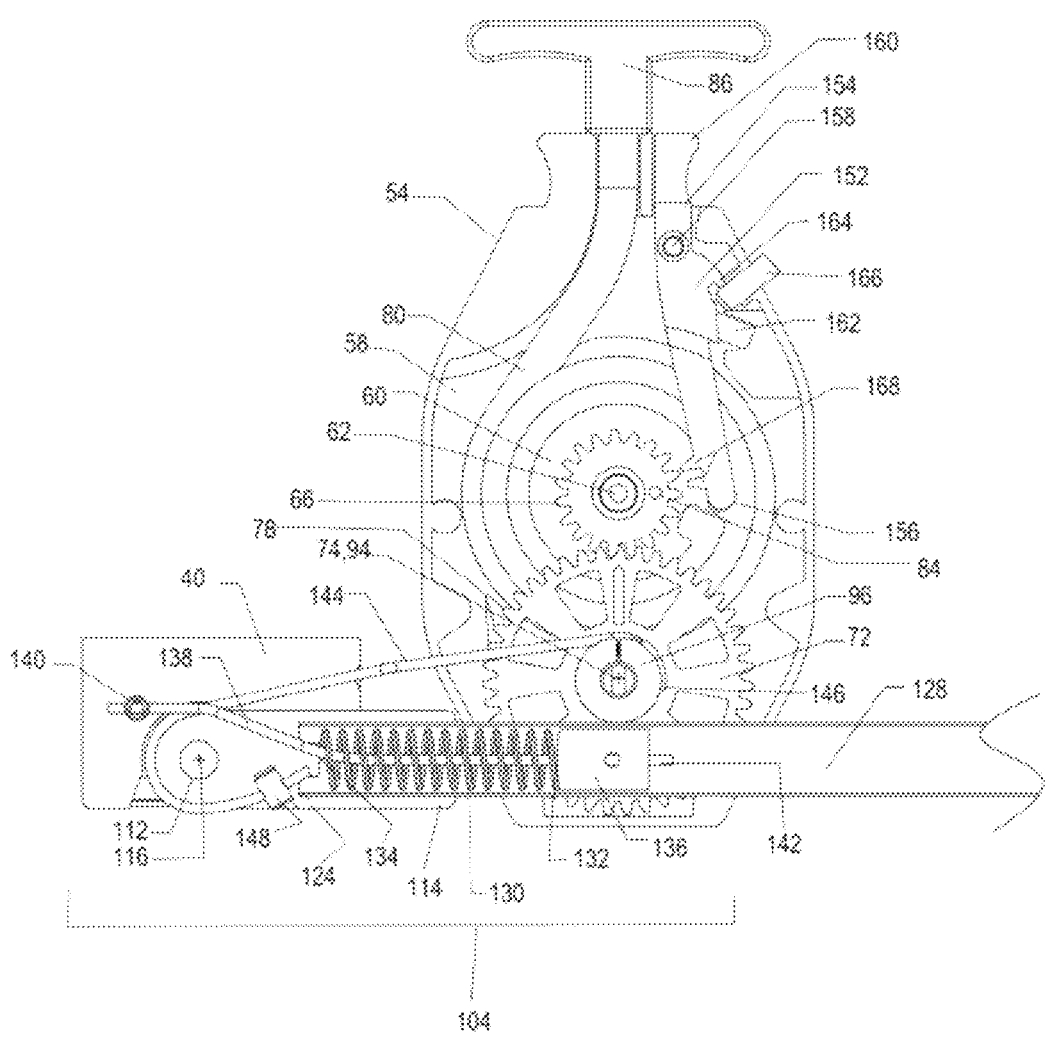
FIG. 13 shows a partial cutaway view of a first leg assembly and actuator of a first embodiment, leg stowed.
Figure 14:
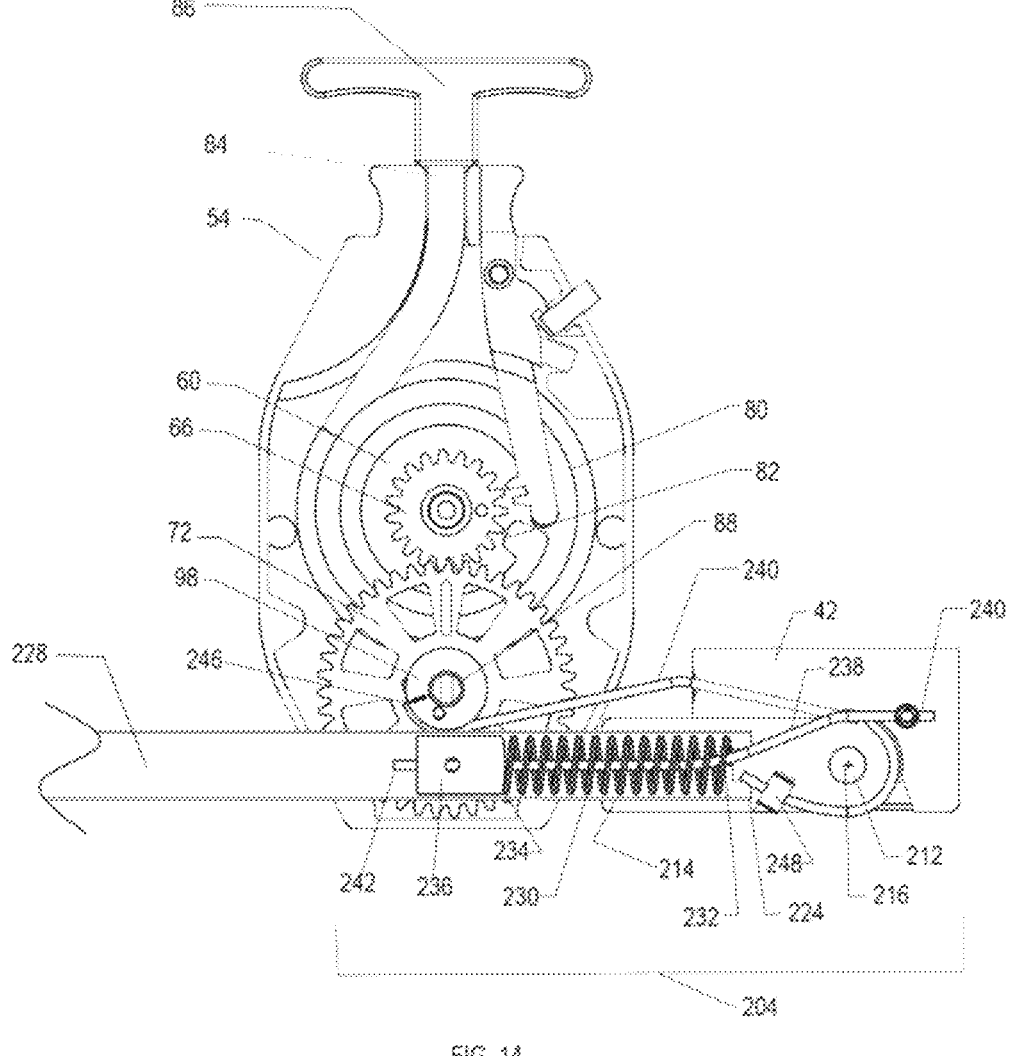
FIG. 14 shows a partial cutaway view of a second leg assembly and actuator of a first embodiment, leg stowed.
Figure 15:
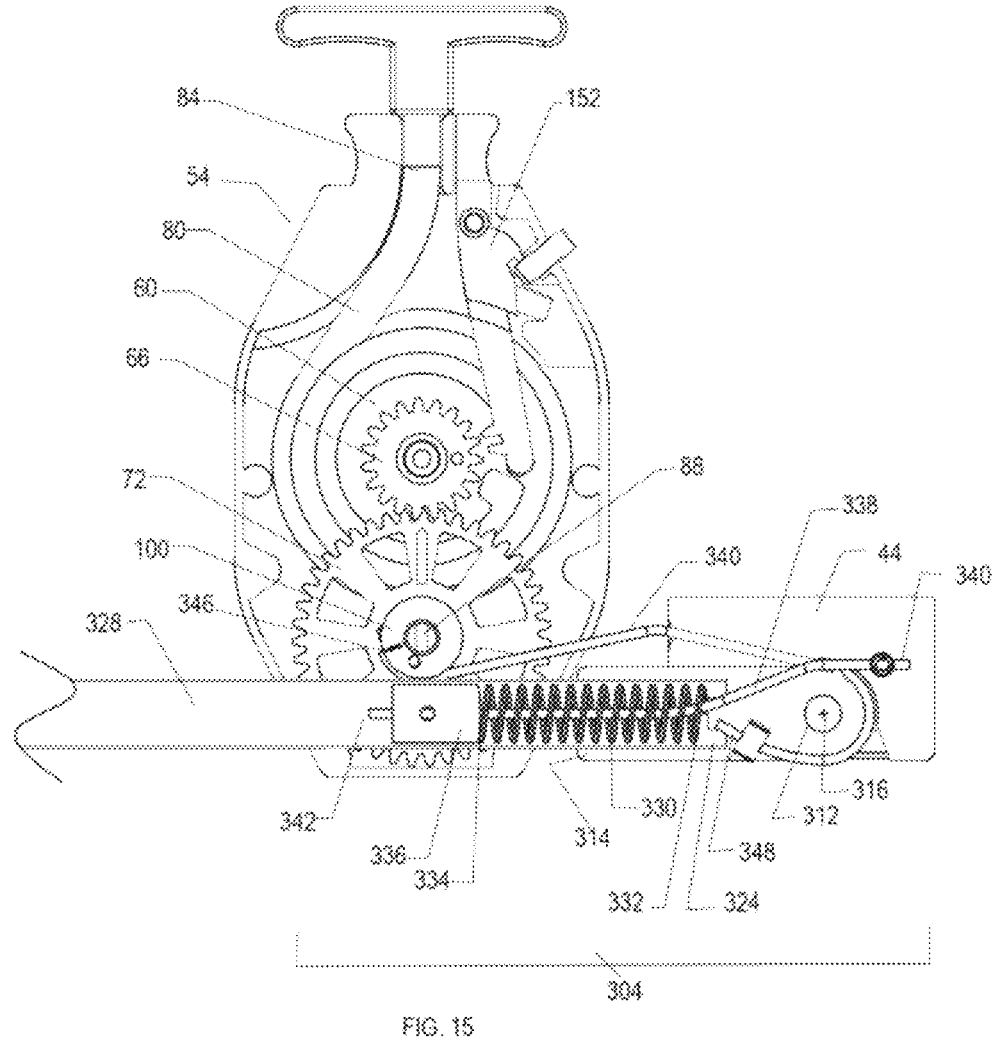
FIG. 15 shows a partial cutaway view of a third leg assembly and actuator of a first embodiment, leg stowed.
Figure 16:
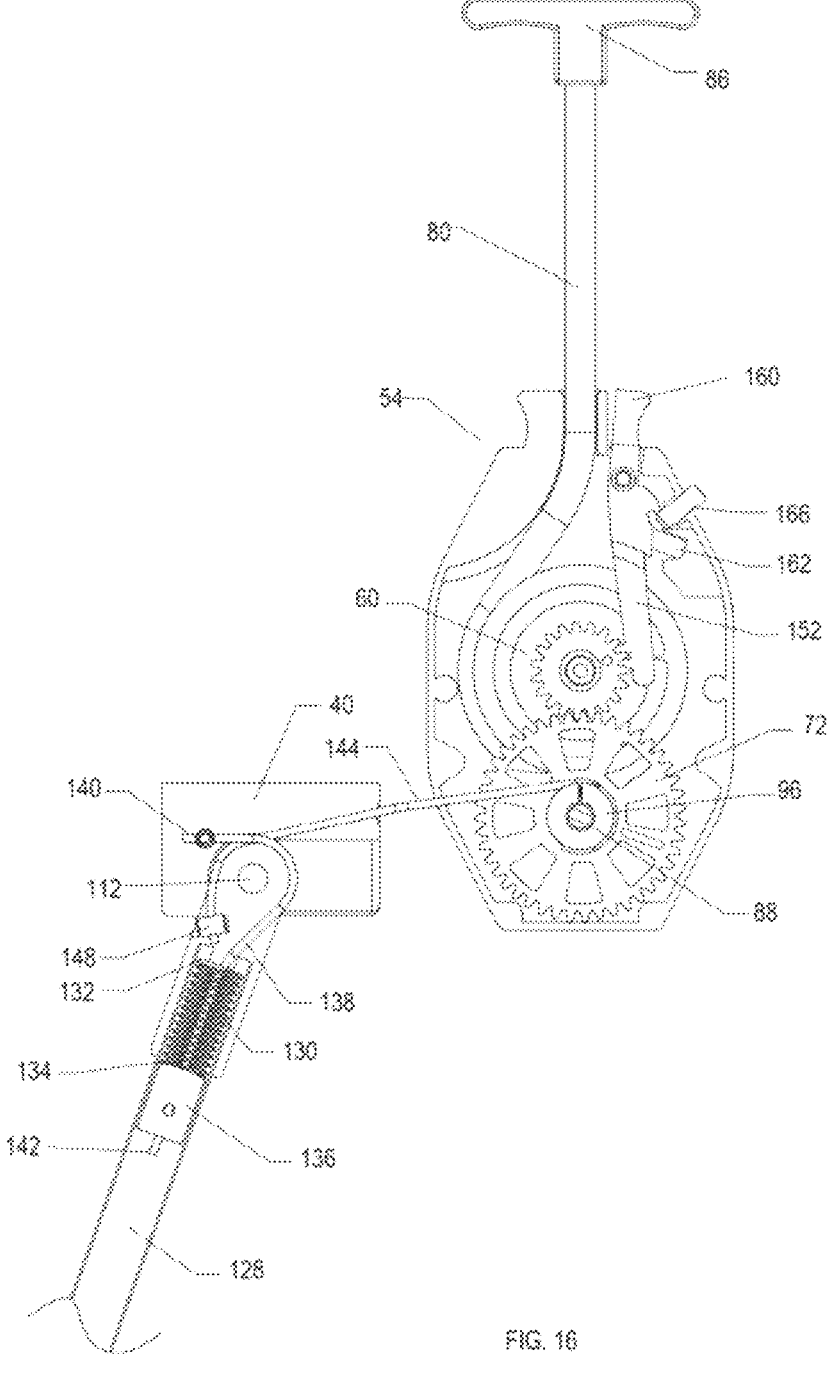
FIG. 16 shows a partial cutaway view of a leg assembly and actuator of a first embodiment, leg deployed.
Figure 17:
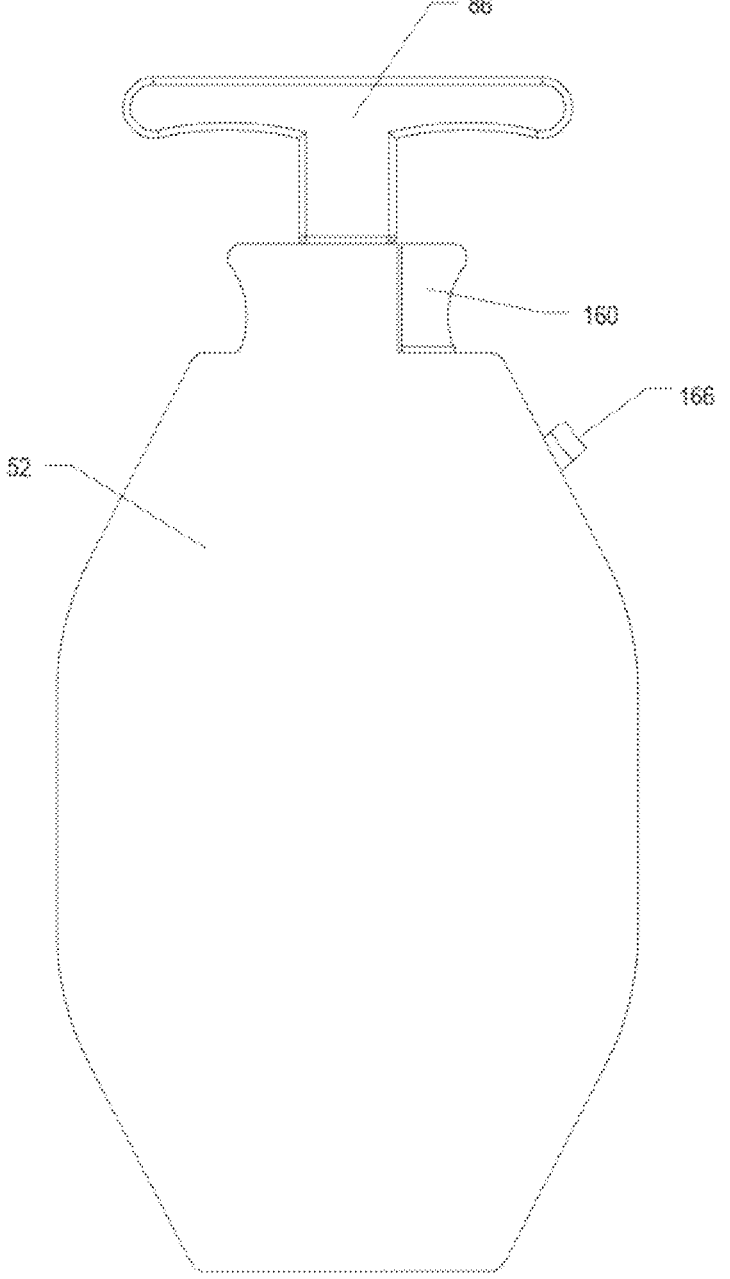
FIG. 17 shows a backside view of an actuator of a first embodiment, in the stowed position.
Figure 18:
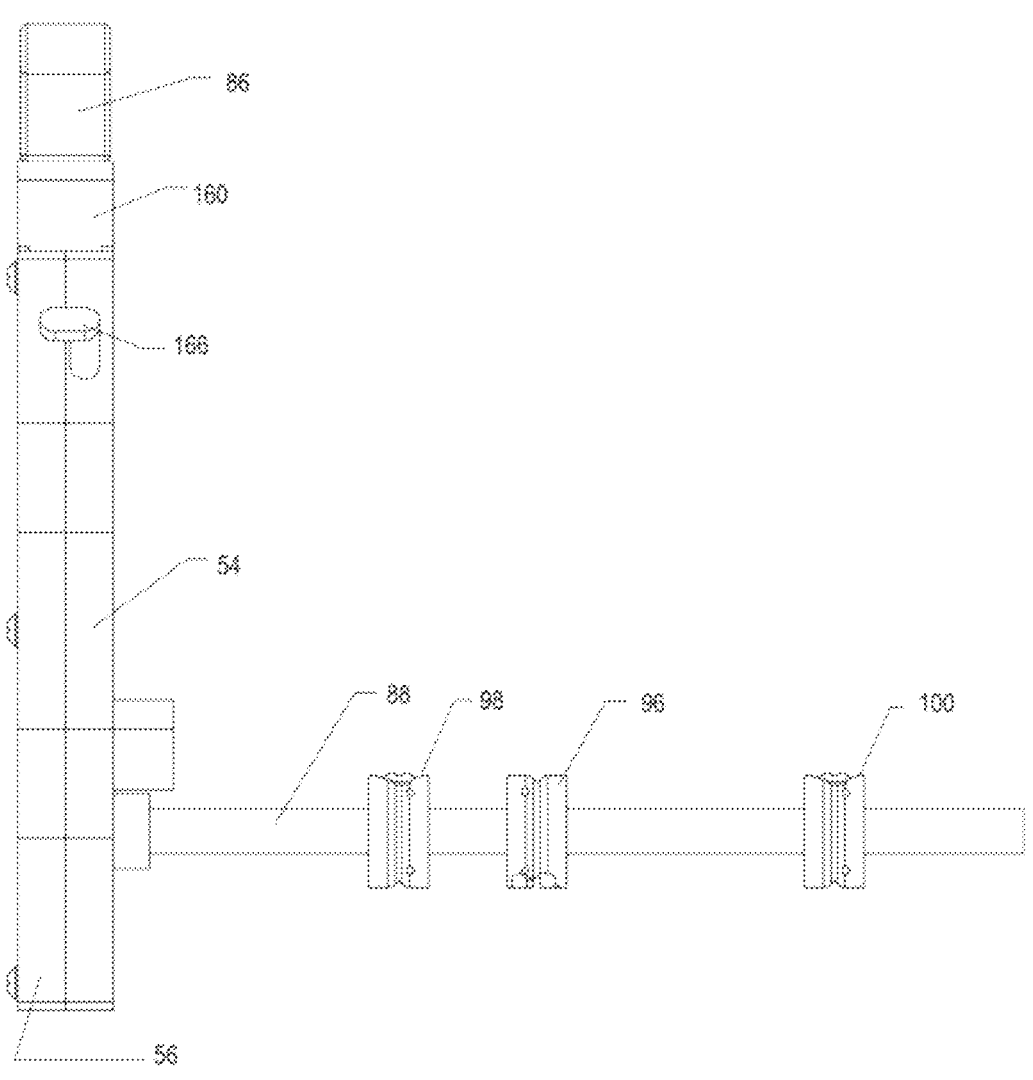
FIG. 18 shows a side view of an actuator and transfer shaft of a first embodiment.
Figure 19:
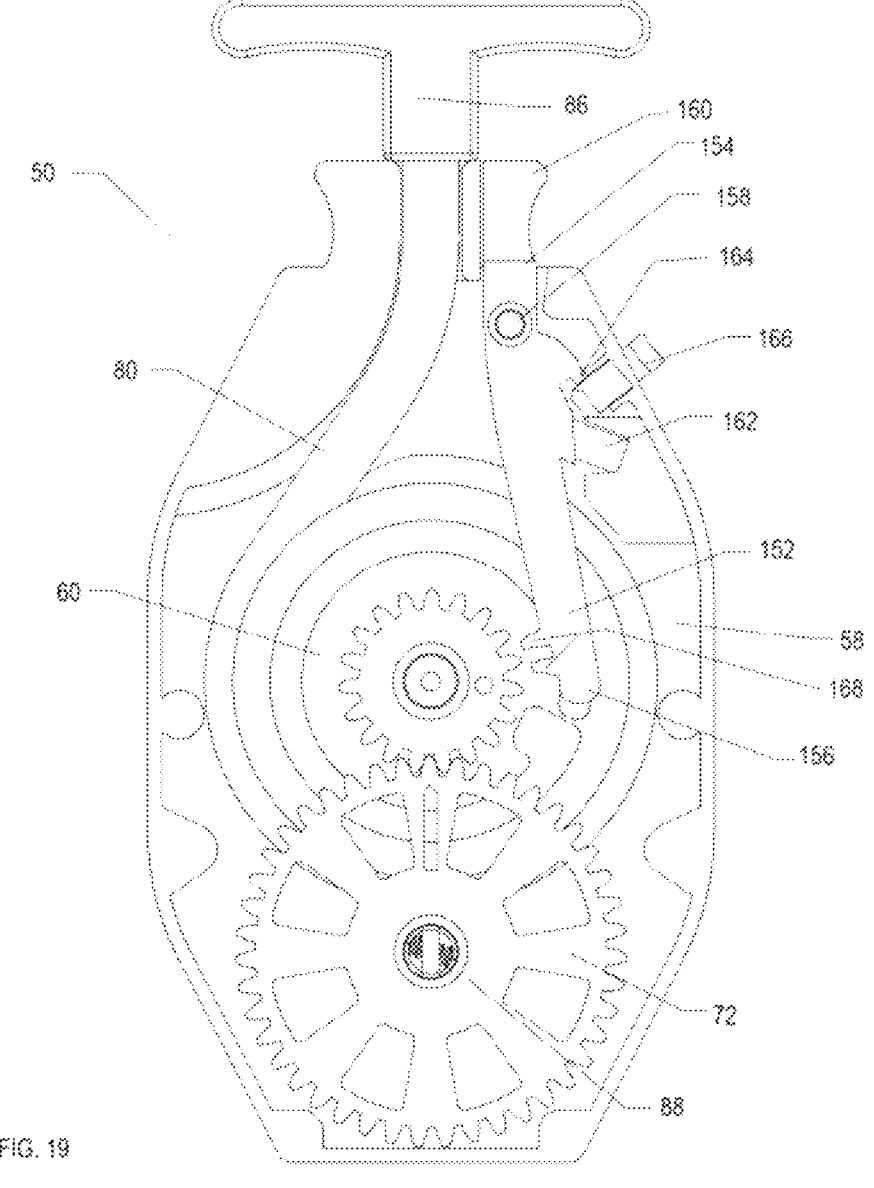
FIG. 19 shows a cutaway view of an actuator of a first embodiment in a stowed condition.
Figure 20:
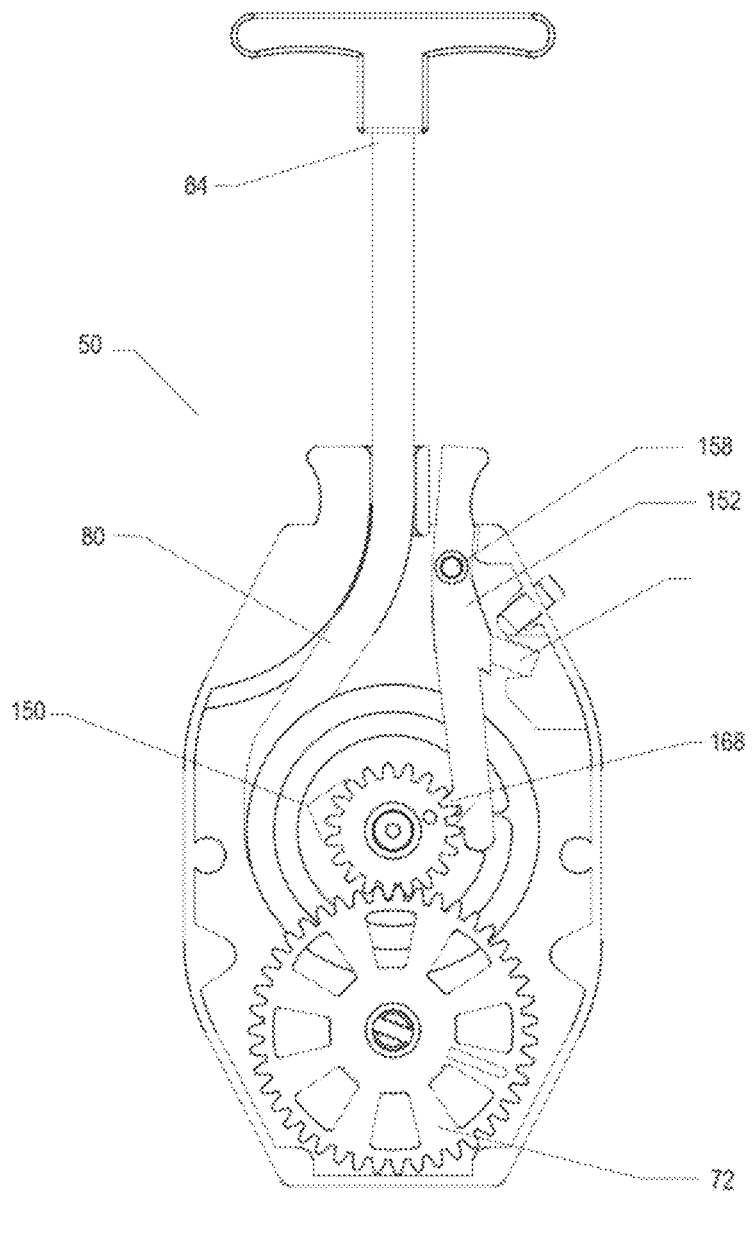
FIG. 20 shows a cutaway view of an actuator of a first embodiment in a deployed condition with lock engaged.
Figure 21:
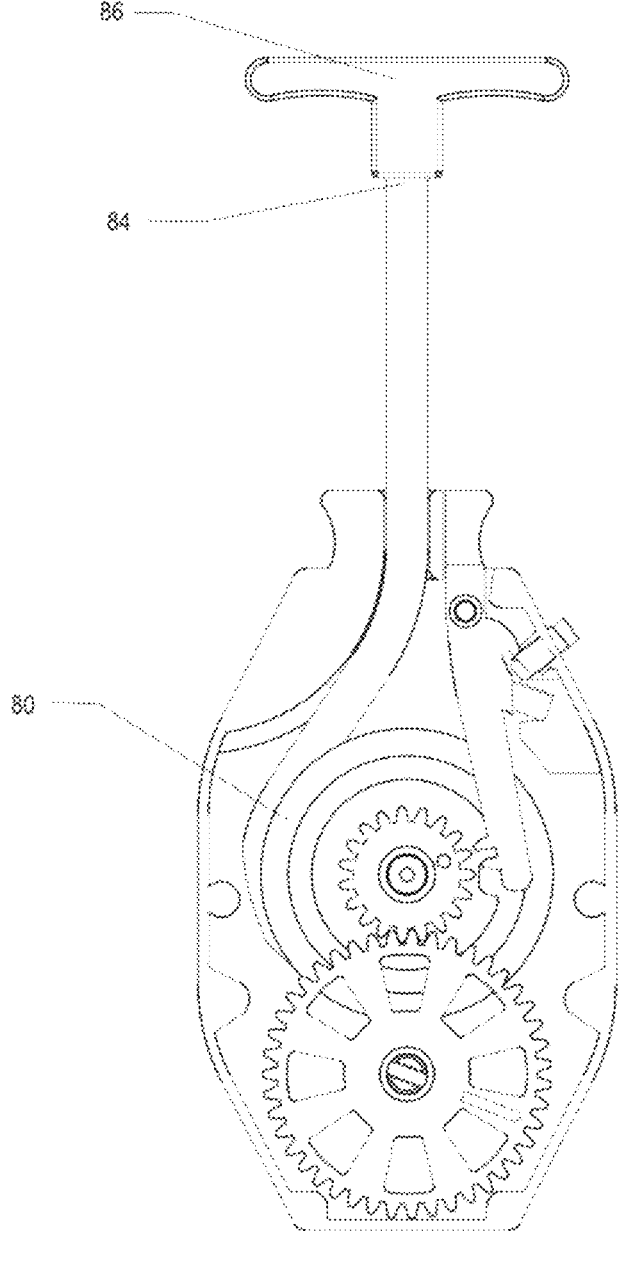
FIG. 21 shows a cutaway view of an actuator of a first embodiment in a deployed condition with lock disengaged.
Figure 22:
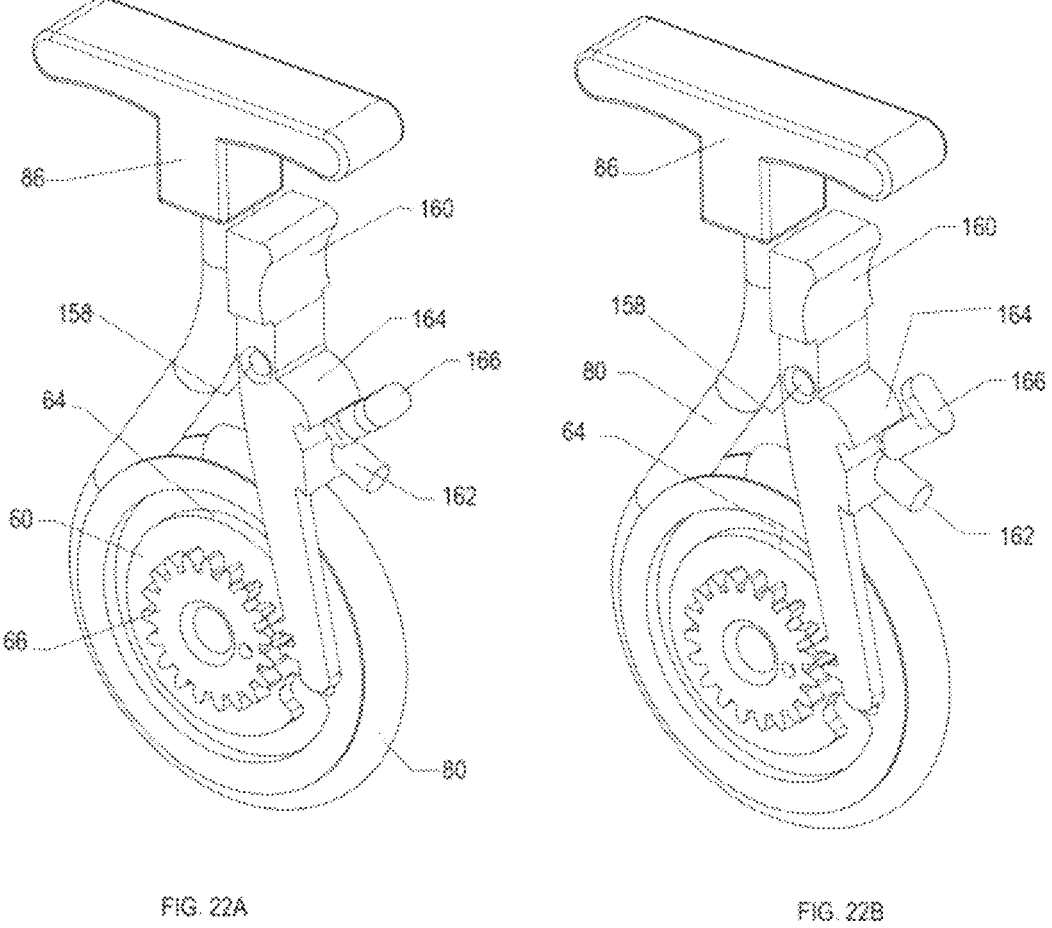
FIG. 22A shows a partial cutaway perspective view of an actuator pulley assembly of a first embodiment, in a stowed condition, with secondary lock disengaged.
FIG. 22B shows a partial cutaway perspective view of an actuator pulley assembly of a first embodiment, in a stowed condition, with secondary lock engaged.
Figure 23:
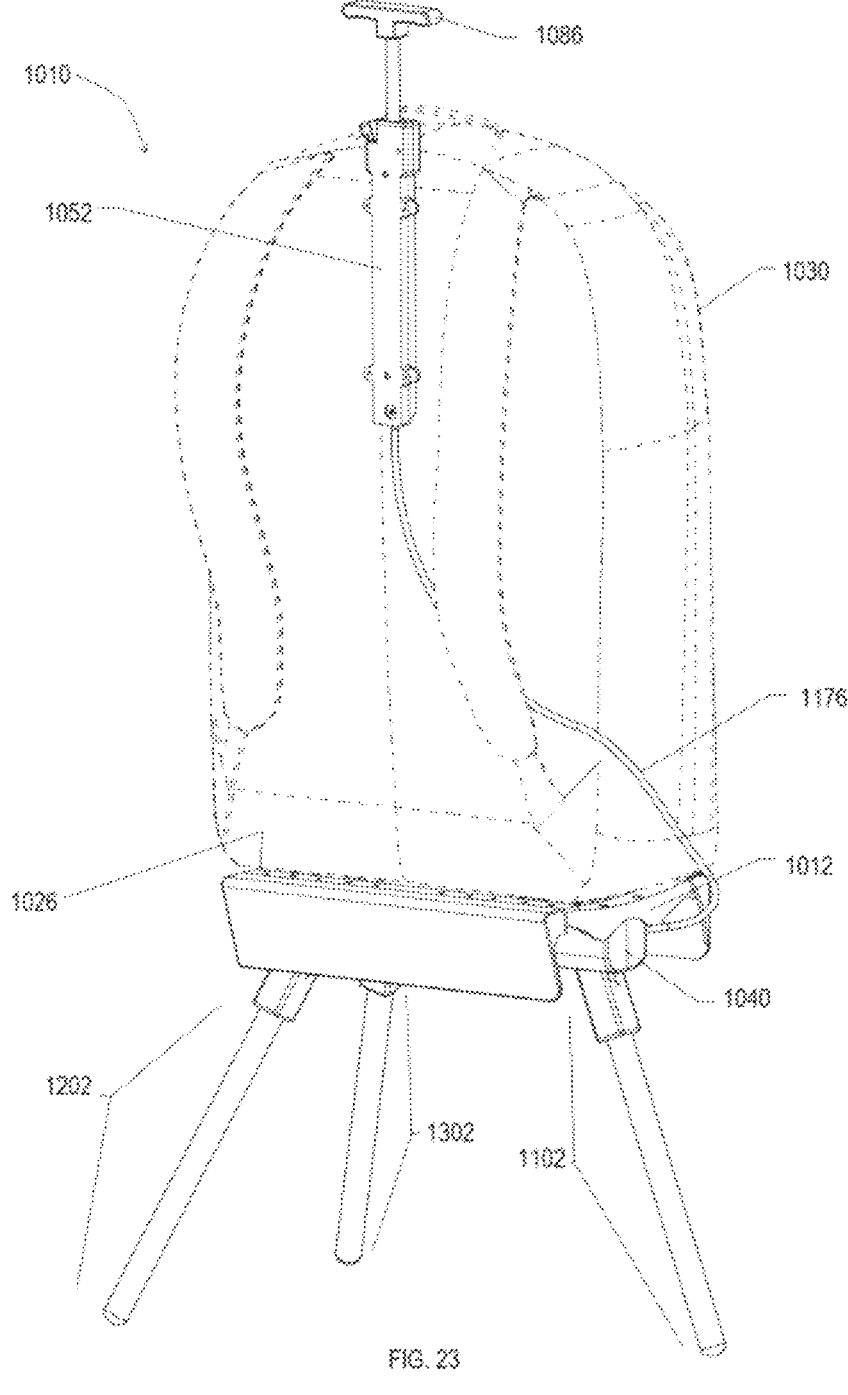
FIG. 23 shows a perspective view of a second embodiment with a load, legs deployed.
Figure 24:
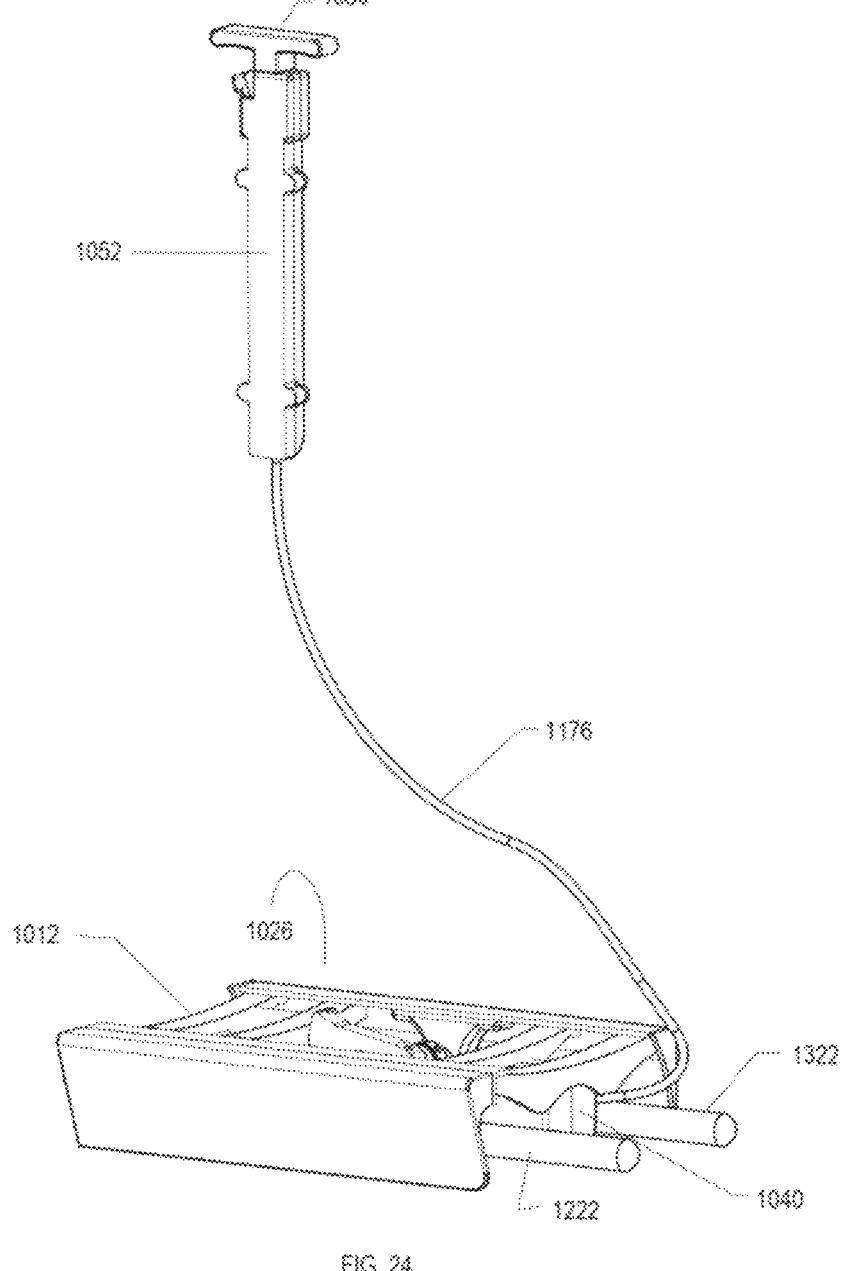
FIG. 24 shows a perspective view of a second embodiment, legs stowed.
Figure 25:
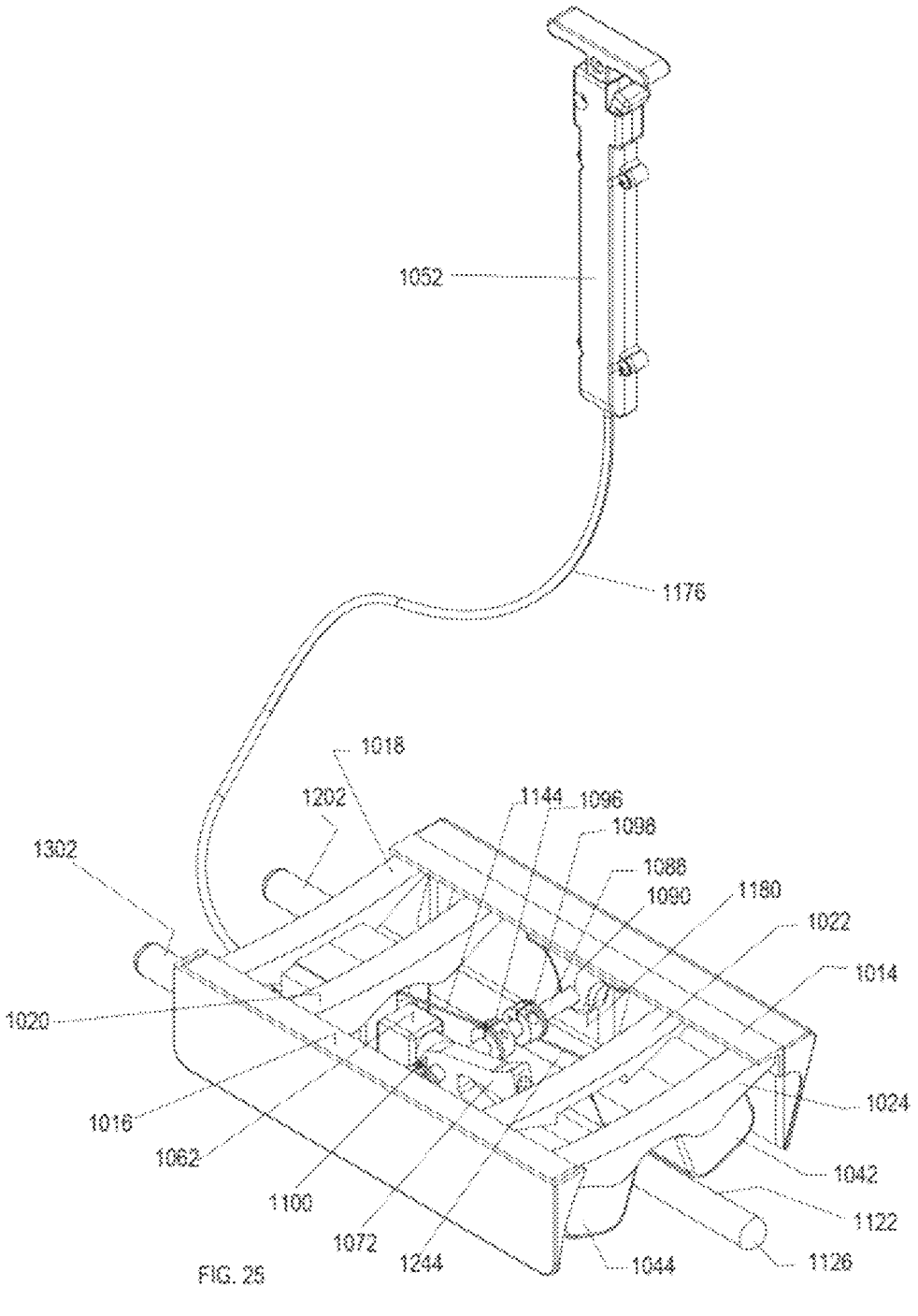
FIG. 25 shows a top perspective view of a second embodiment, legs stowed.
Figure 26:
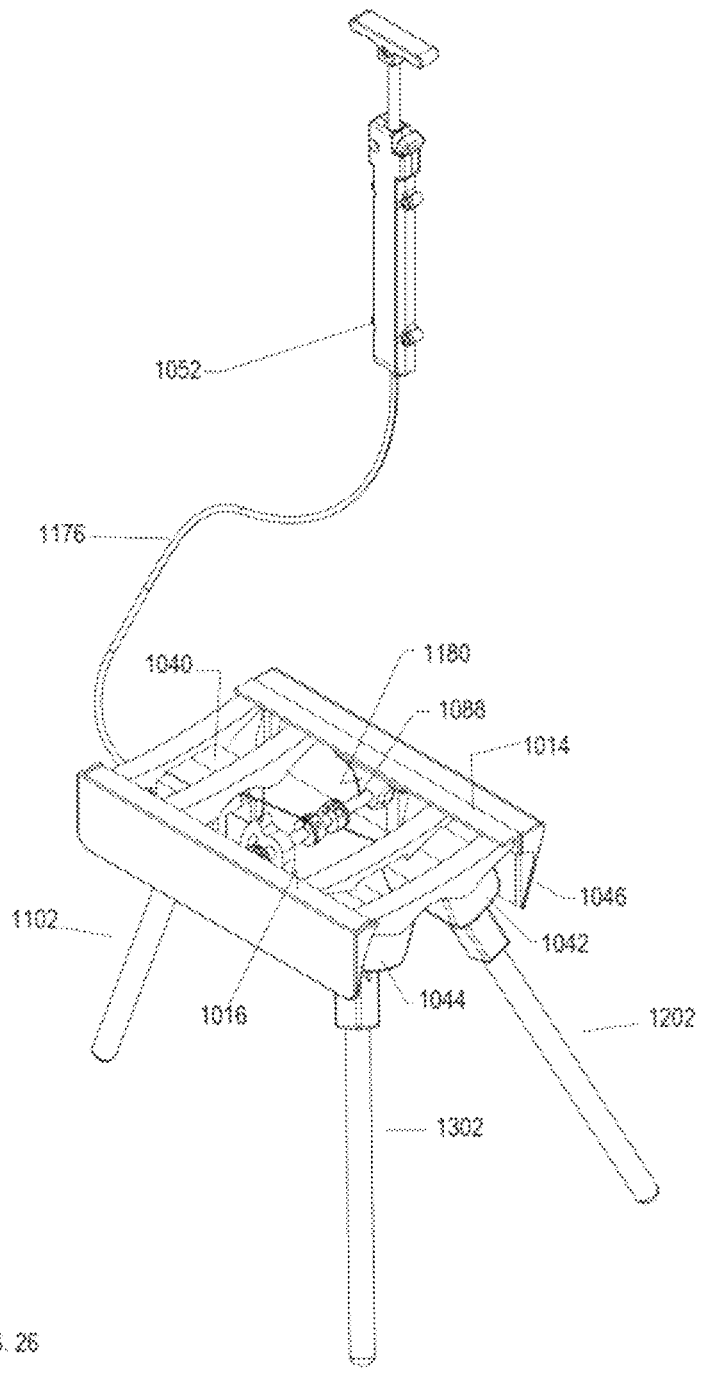
FIG. 26 shows a top perspective view of a second embodiment, legs stowed.
Figure 27:
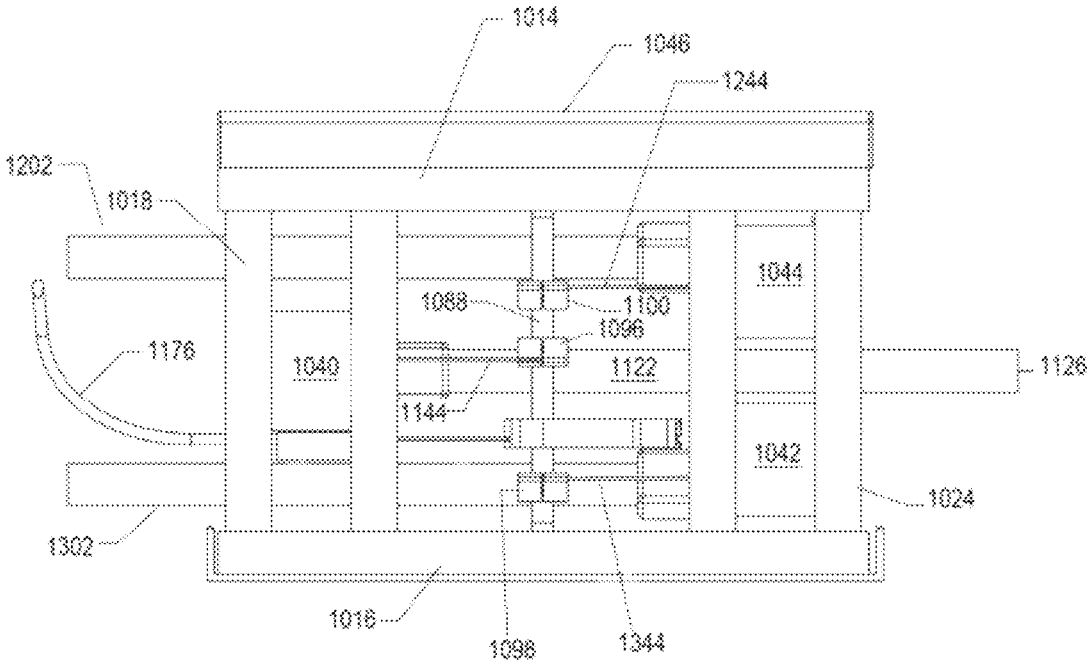
FIG. 27 shows top view of a second embodiment, legs stowed.
Figure 28:
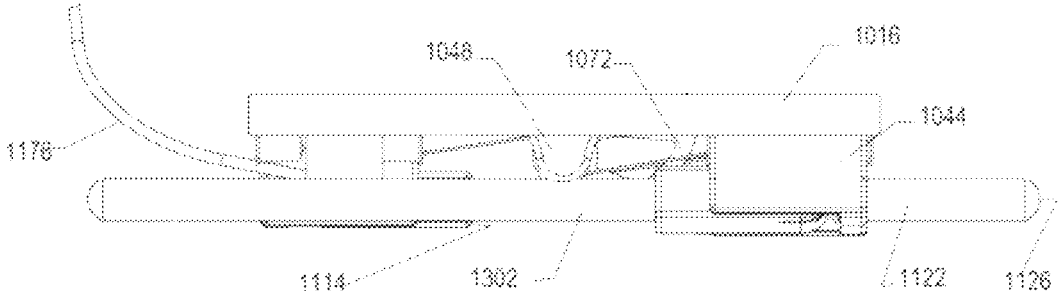
FIG. 28 shows a side view of a second embodiment, legs stowed.
Figure 29:
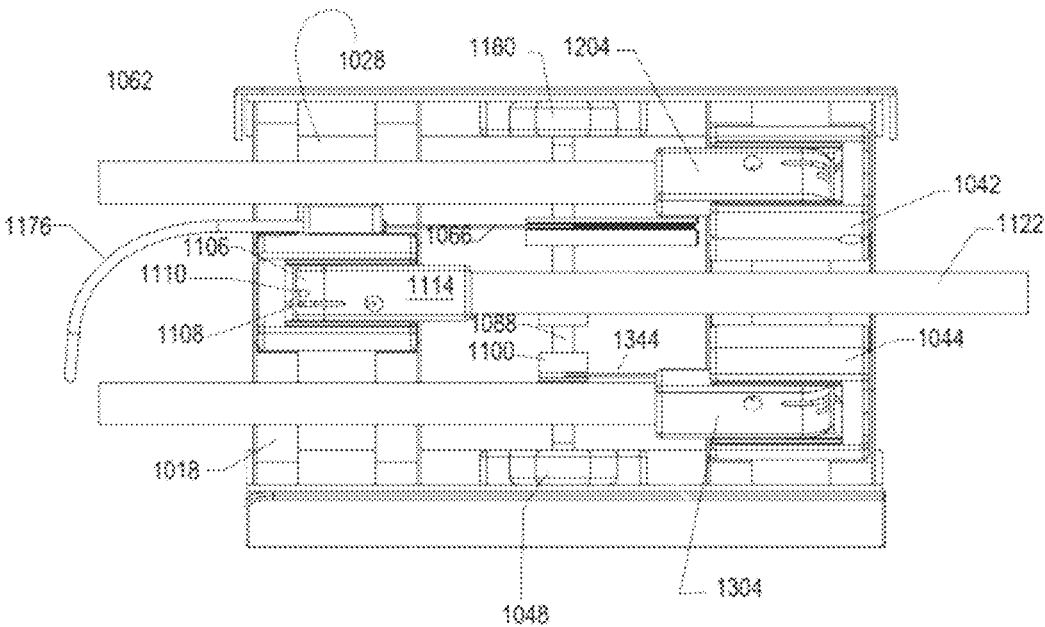
FIG. 29 shows a bottom view of a second embodiment, legs stowed.
Figure 30:
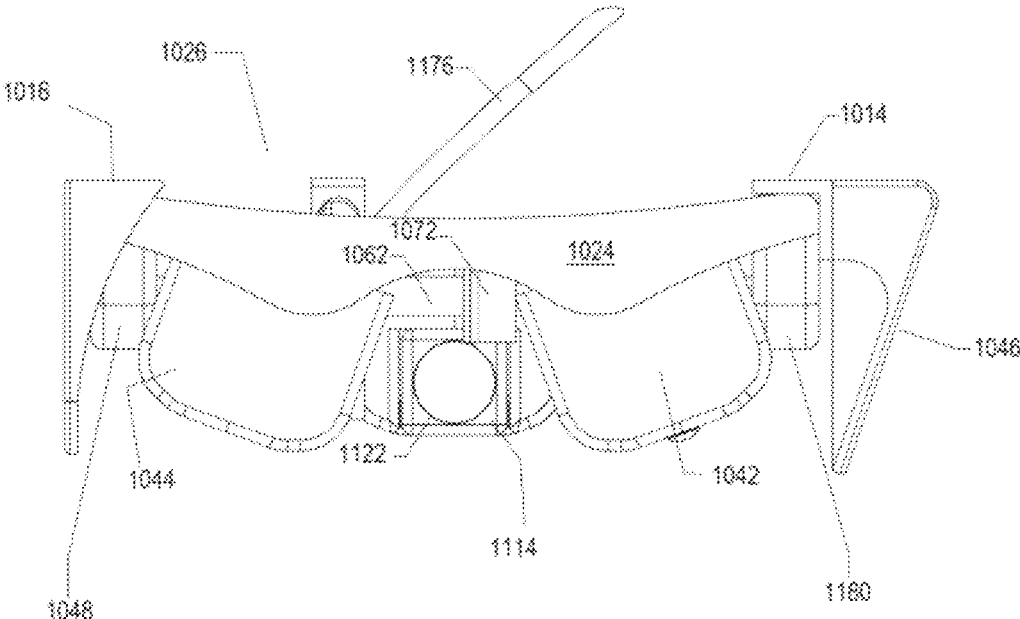
FIG. 30 shows a side view of a second embodiment, legs stowed.
Figure 31:
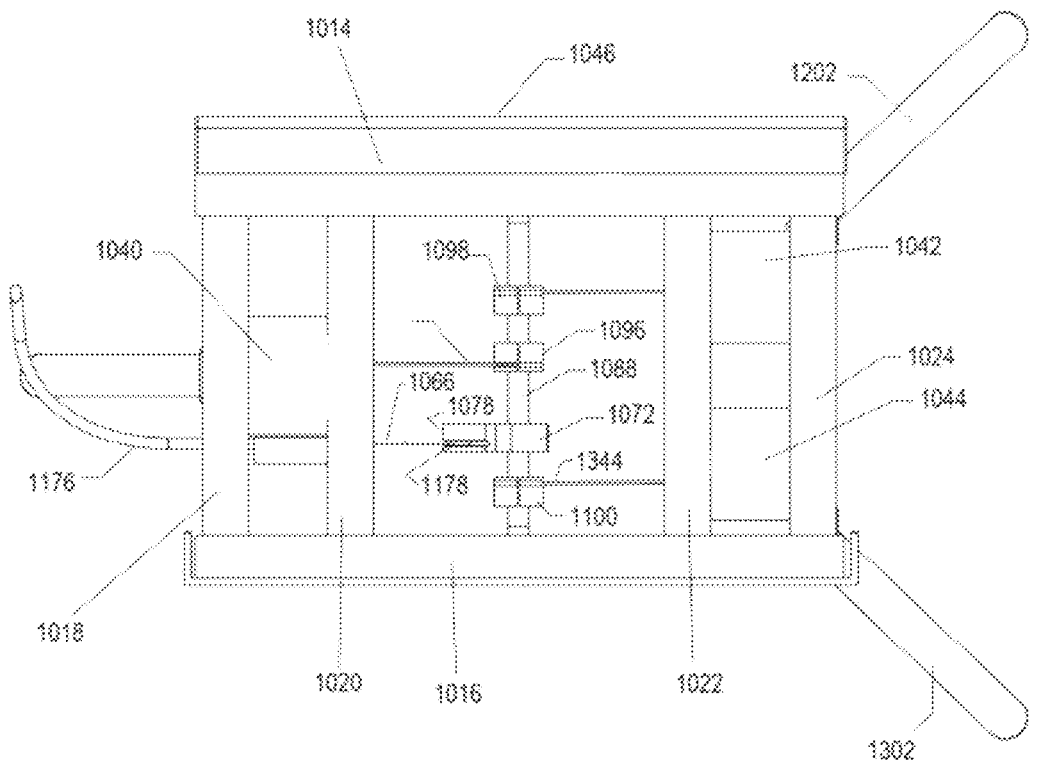
FIG. 31 shows a top view of a second embodiment, legs deployed.
Figure 32:
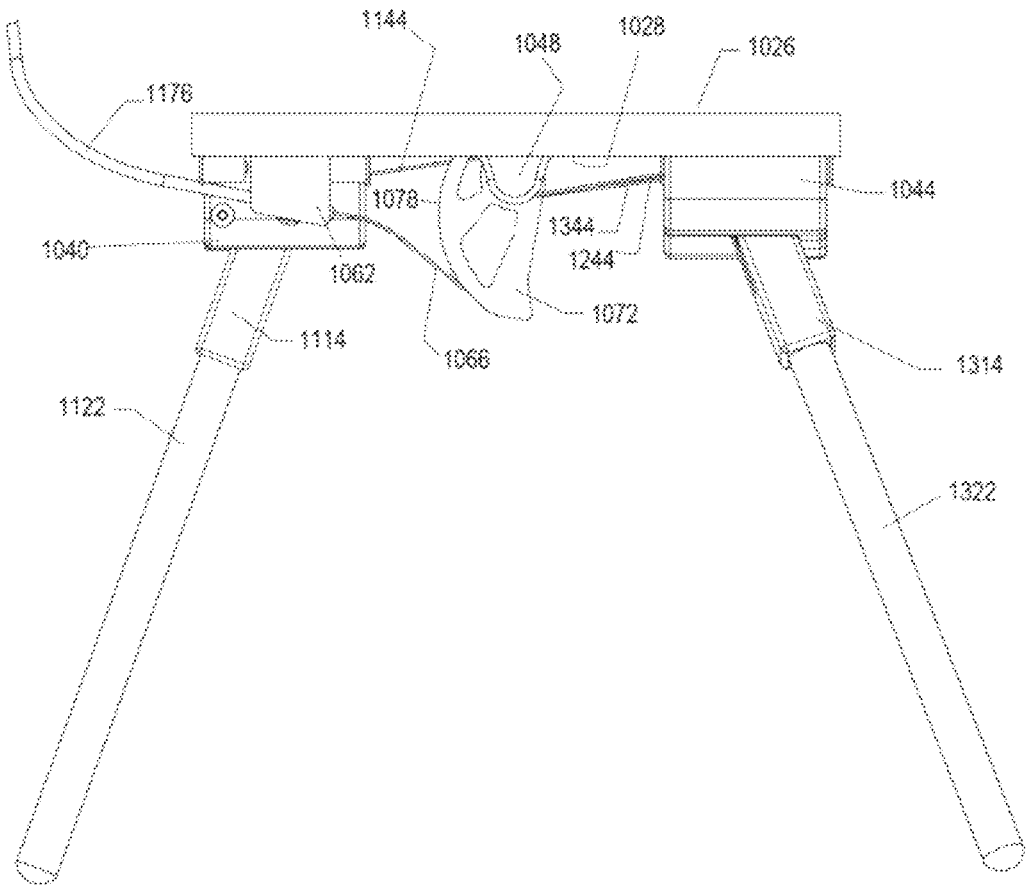
FIG. 32 shows a side view of a second embodiment, legs deployed.
Figure 33:
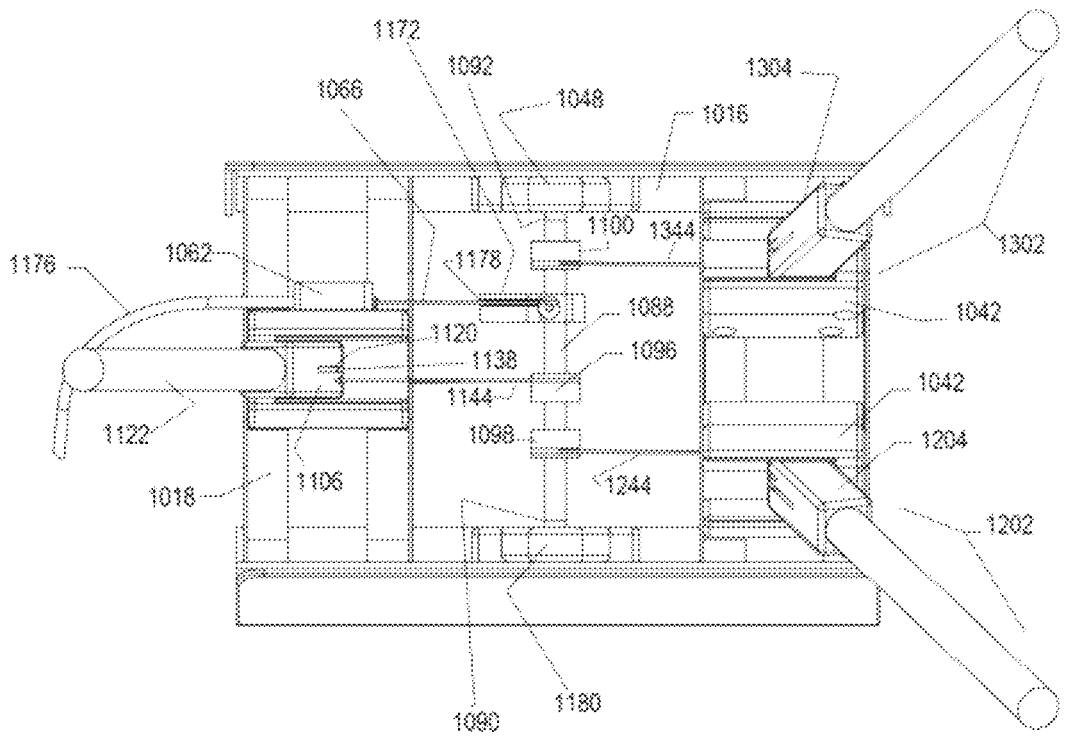
FIG. 33 shows a bottom view of a second embodiment, legs deployed.
Figure 34:
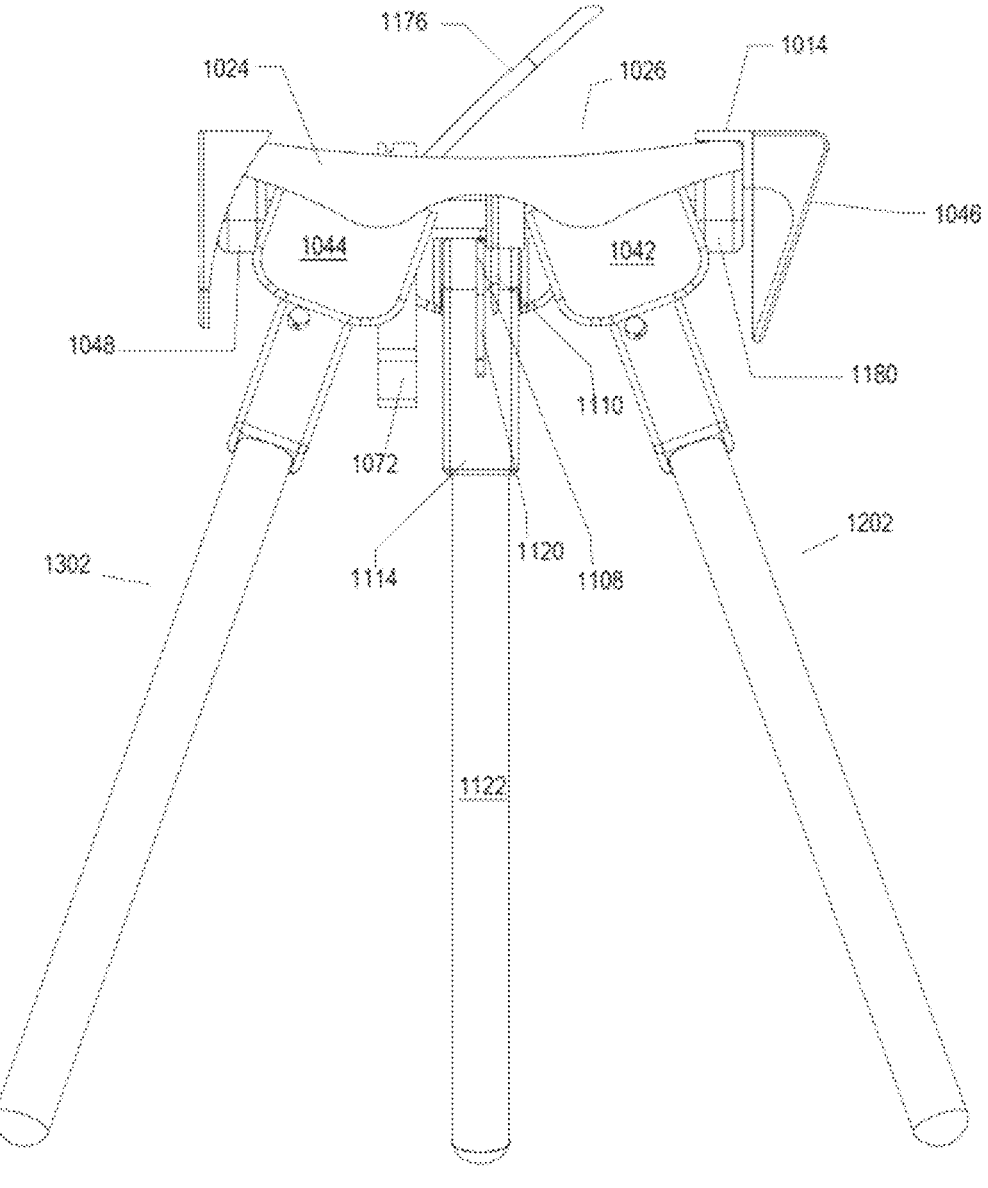
FIG. 34 shows a side view of a second embodiment, legs deployed.
Figures 35A, 35B:
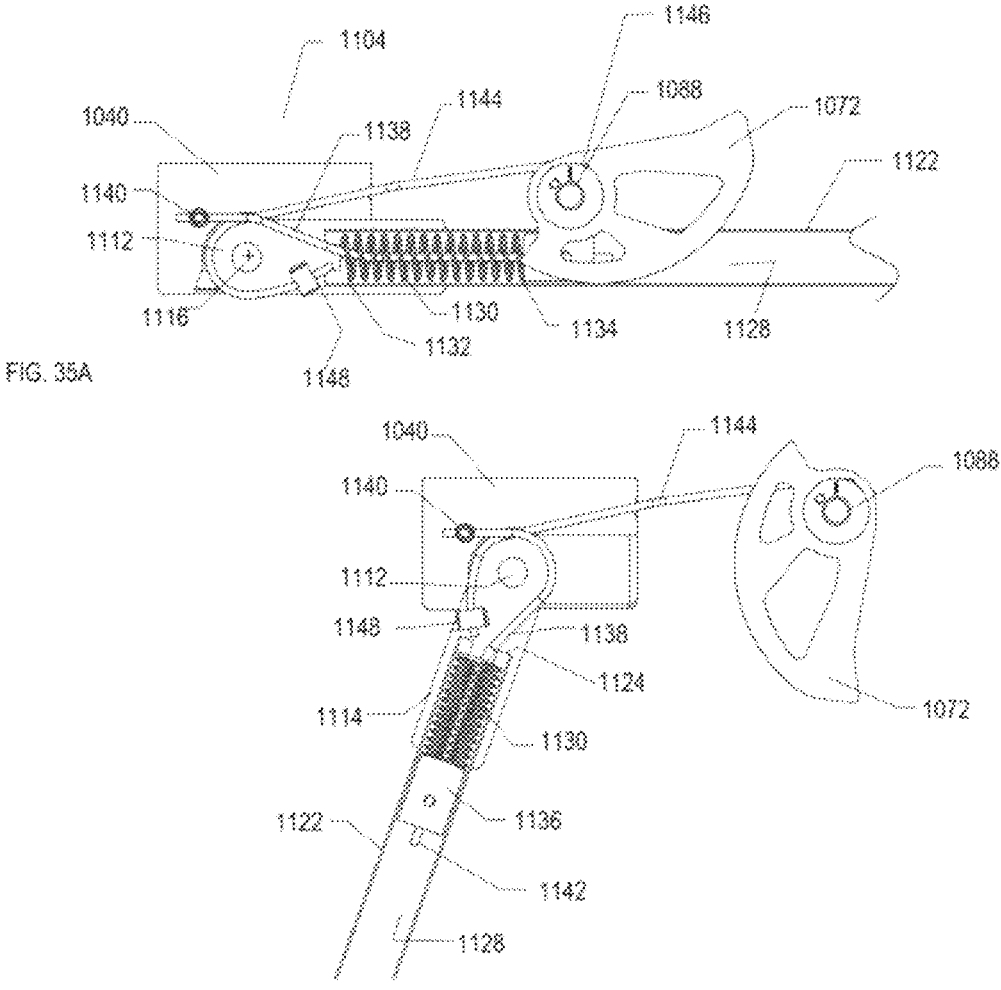
FIG. 35A shows a cutaway view of a first leg of a second embodiment, leg stowed.
FIG. 35B shows a cutaway view of a first leg of a second embodiment, leg deployed.
Figure 36A:
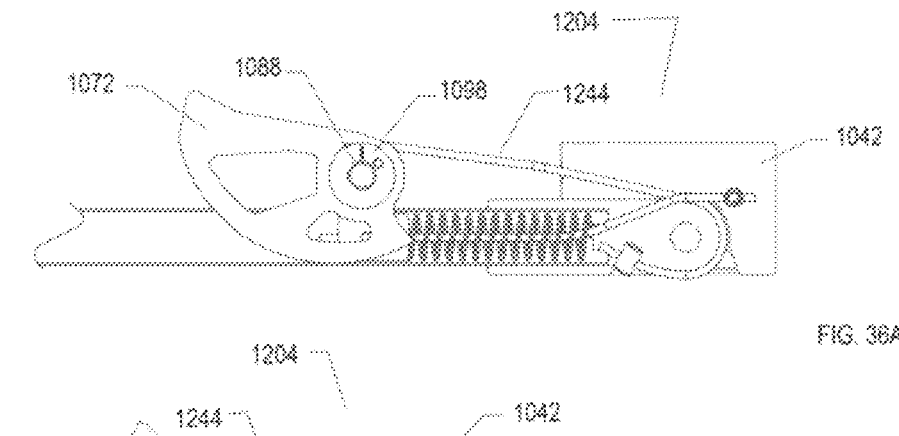
FIG. 36A shows a cutaway view of a second leg of a second embodiment, leg stowed.
Figure 36B:
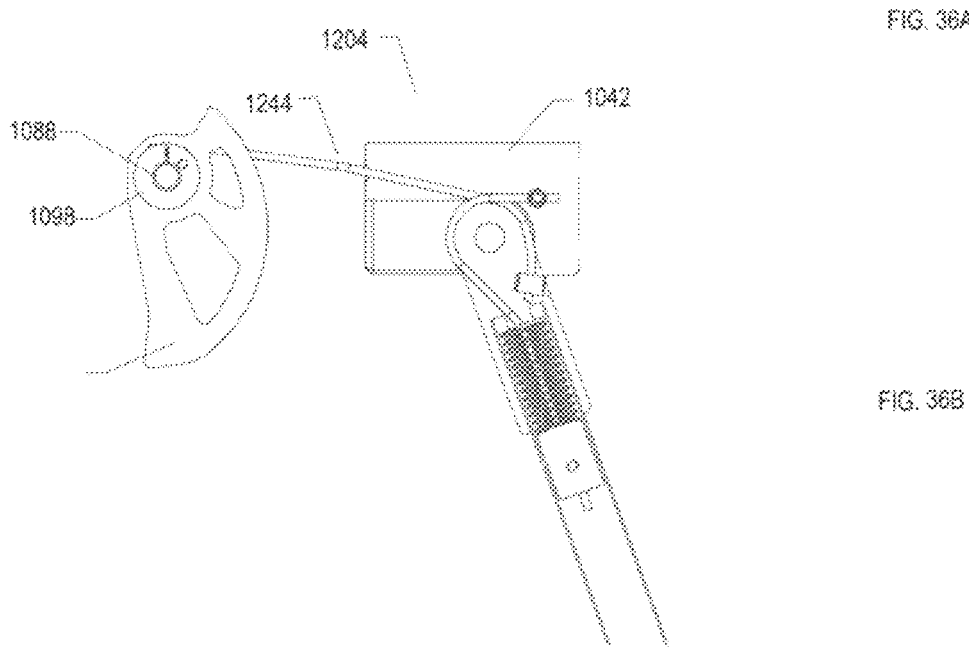
FIG. 36B shows a cutaway view of a second leg of a second embodiment, leg deployed.
Figure 37A:
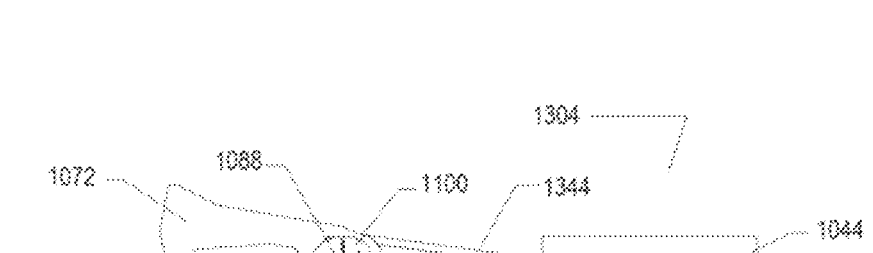
FIG. 37A shows a cutaway view of a third leg of a second embodiment, leg stowed.
Figure 37B:
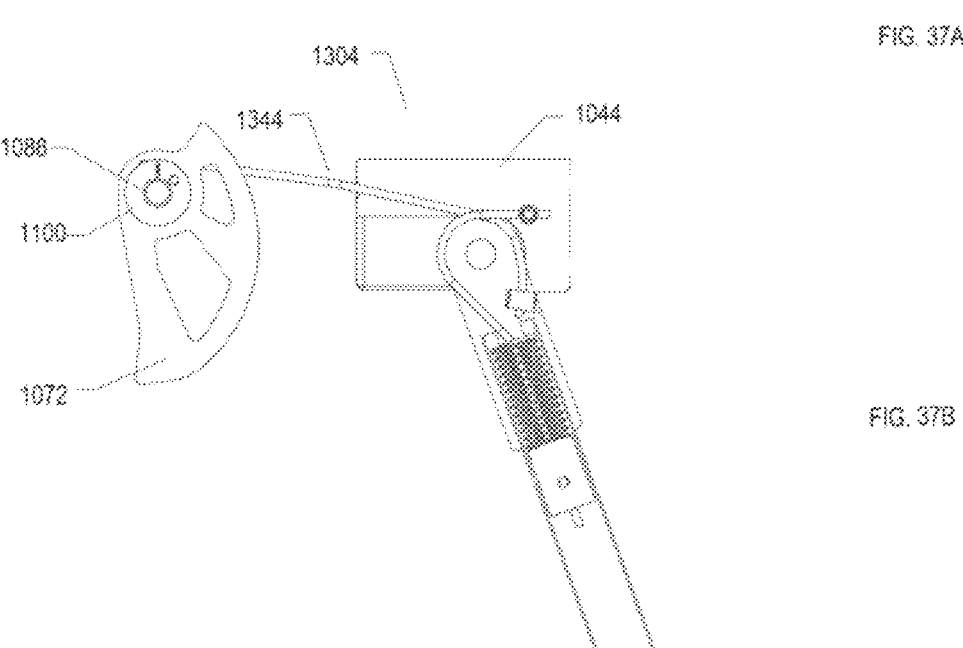
FIG. 37B shows a cutaway view of a third leg of a second embodiment, leg deployed.
Figure 38:
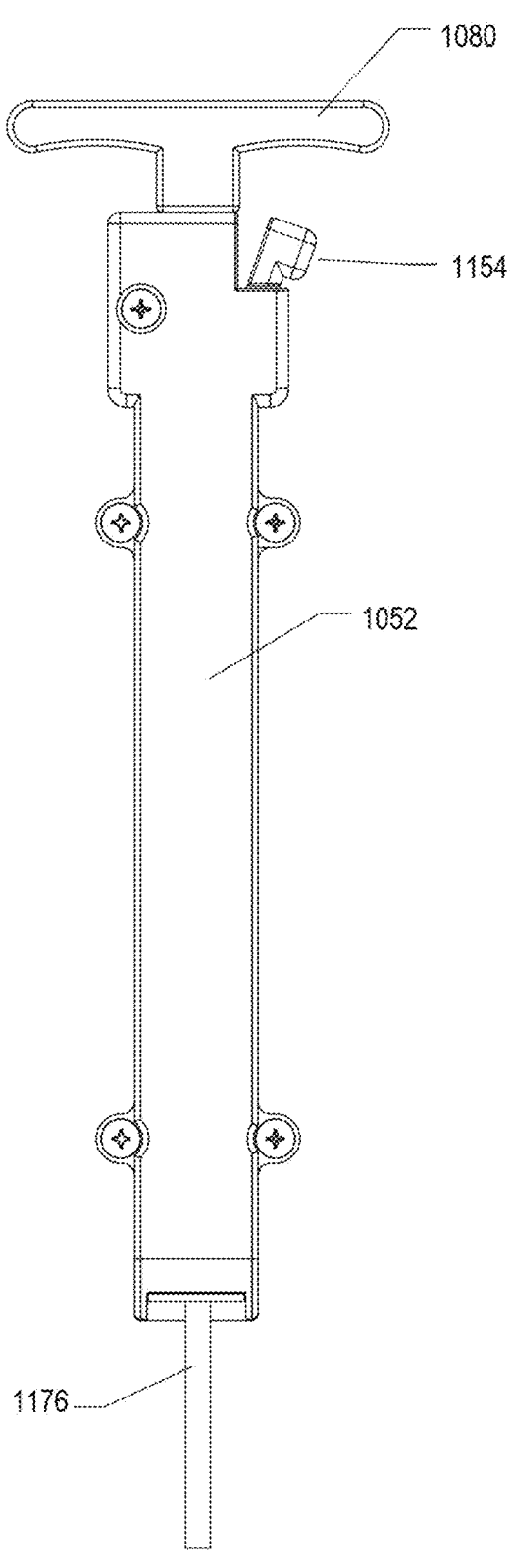
FIG. 38 shows a front side view of an actuator of a second embodiment.
Figure 39:
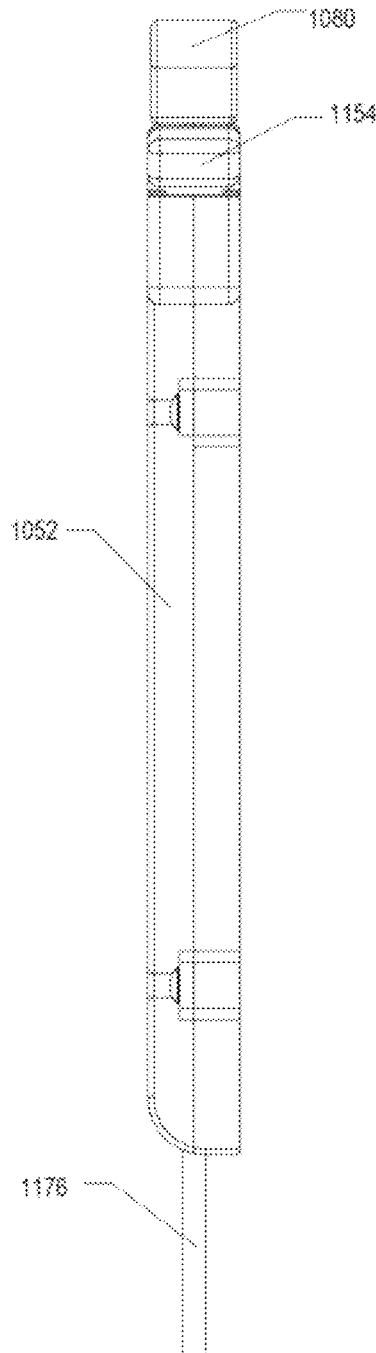
FIG. 39 shows a side view of an actuator of a second embodiment.
Figure 40:
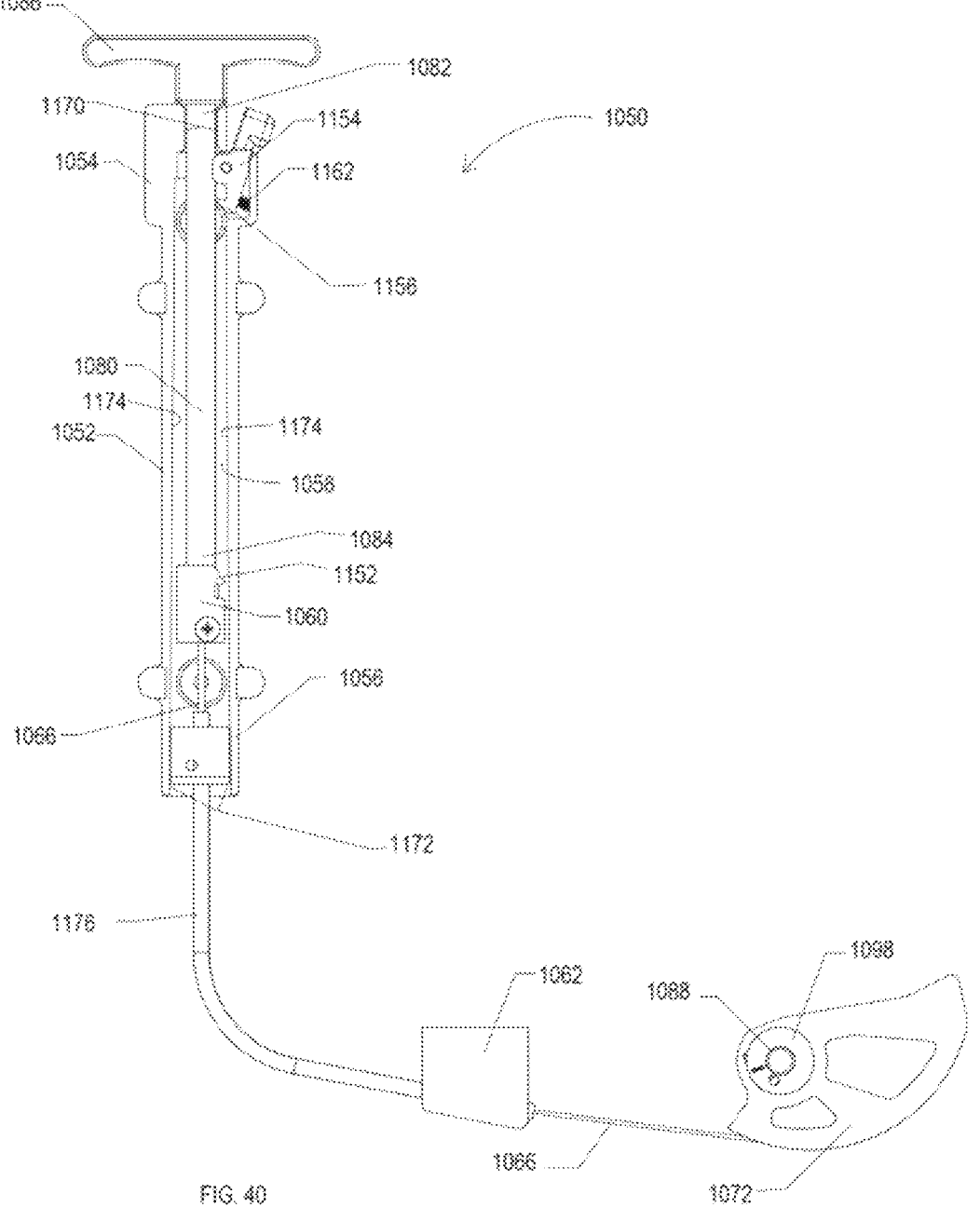
FIG. 40 shows a cutaway view of an actuator of a second embodiment, legs stowed.
Figure 41:
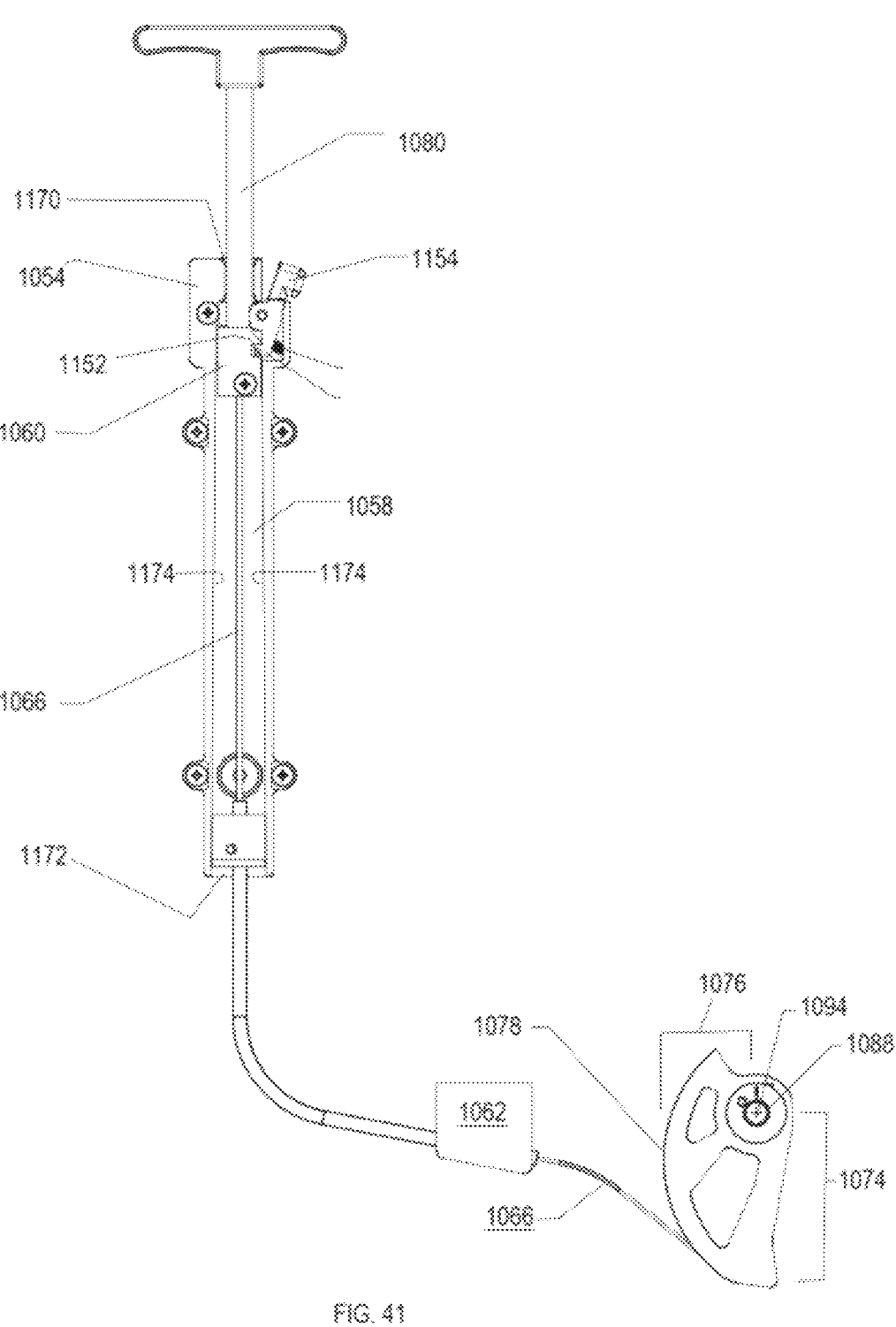
FIG. 41 shows a cutaway view of an actuator of a second embodiment, legs deployed and actuator locked.
Figure 41A:
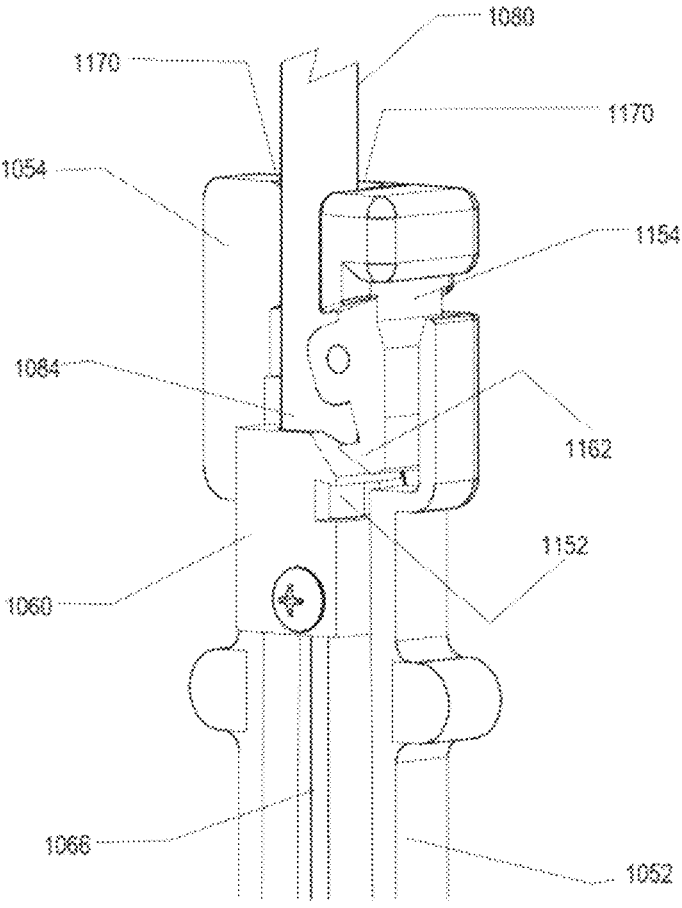
FIG. 41A shows a close-up cutaway view of an actuator lock of a second embodiment.
Figure 42:
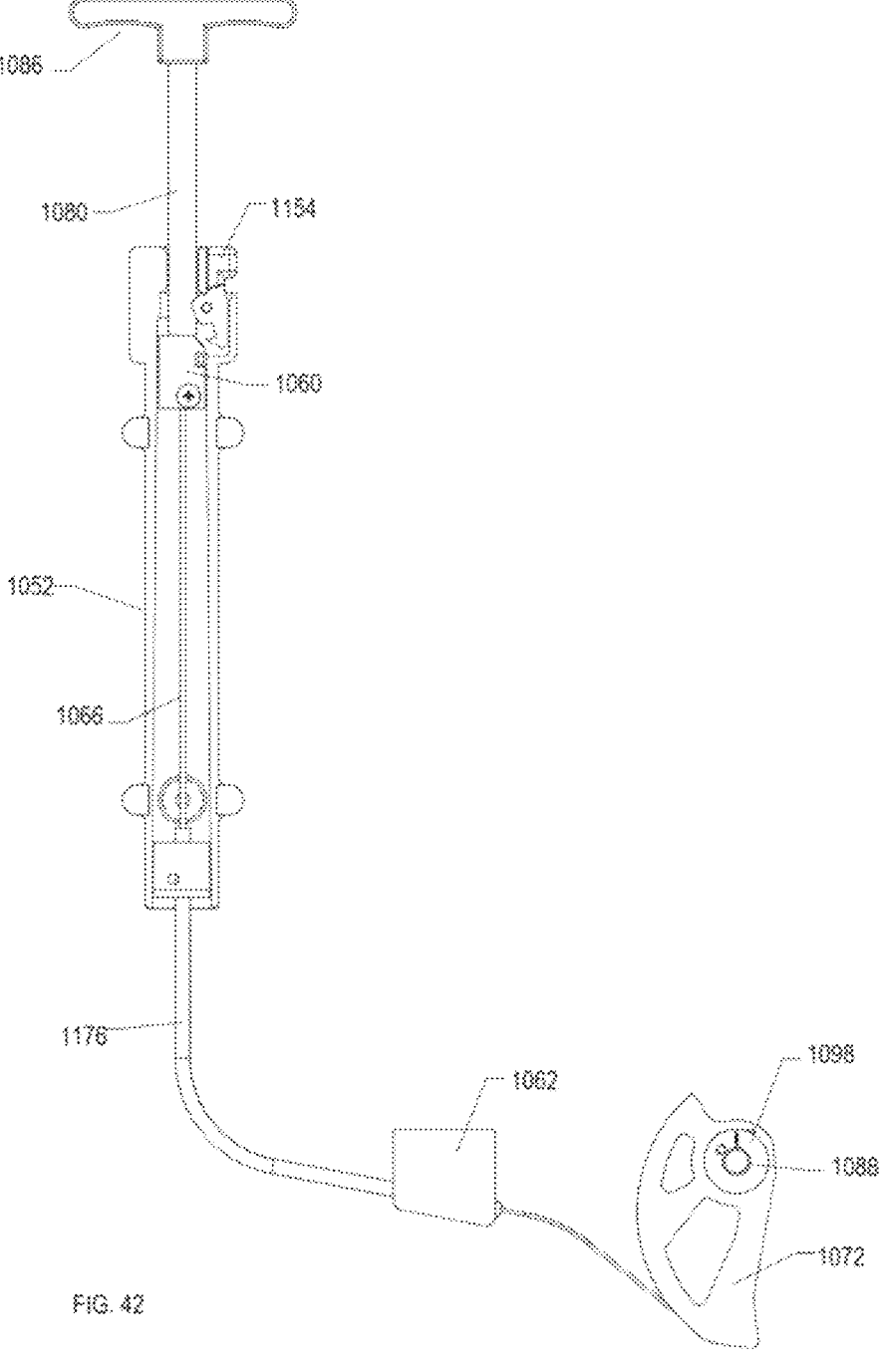
FIG. 42 shows a cutaway view of an actuator of a second embodiment, legs deployed.

Turning now descriptively to the drawings, in which similar reference characters denote similar elements throughout the several views, the figures illustrate the of the present invention. With regard to the reference numerals used, the following numbering is used throughout the various drawing figures:

| Ref. Nr. | Description |
| --- | --- |
| 10 | First Embodiment |
| 12 | Rigid Frame Portion |
| 14 | First Transverse Beam |
| 16 | Second Transverse Beam |
| 18 | First Longitudinal Beam |
| 20 | Second Longitudinal Beam |
| 22 | Third Longitudinal Beam |
| 24 | Fourth Longitudinal Beam |
| 26 | Rigid Frame Portion Top Area |
| 28 | Rigid Frame Portion Bottom Area |
| 30 | Load |
| 32 | Connecting Strap |
| 34 | Connecting Strap |
| 36 | Connecting Strap |
| 38 | Connecting Strap |
| 40 | First Leg Assembly Hinge Case |
| 42 | Second Leg Assembly Hinge Case |
| 44 | Third Leg Assembly Hing Case |
| 46 | Frame First Bottom Flange |
| 48 | Bushing |
| 50 | Actuator Portion |
| 52 | Actuator Case |
| 54 | Actuator Case First Part |
| 56 | Actuator Case Second Part |
| 58 | Actuator Case Interior |
| 60 | Actuator Pulley |
| 62 | Actuator Pulley Rotation Axis |
| 64 | Actuator Pulley Outer Engagement Surface |
| 66 | Actuator Pulley Gear |
| 72 | Transfer shaft actuator gear |
| 74 | Transfer shaft actuator gear Rotation Axis |
| 78 | Transfer shaft actuator gear Teeth |
| 80 | Actuator Portion Manual Pull |
| 82 | Manual Pull First End |
| 84 | Manual Pull Second End |
| 86 | Manual Pull Handle |
| 88 | Transfer Shaft |
| 90 | Transfer Shaft First End |
| 92 | Transfer Shaft Second End |
| 94 | Transfer Shaft Rotation Axis |
| 96 | First Transfer Pulley |

-continued

| Ref. Nr. | Description |
| --- | --- |
| 98 | Second Transfer Pulley |
| 100 | Third Transfer Pulley |
| 102 | First Leg Assembly |
| 104 | First Leg Hinge Portion |
| 106 | First Leg Hinge Portion Outer Surface |
| 108 | First Leg Hinge Portion Outer Surface First Channel |
| 110 | First Leg Hinge Portion Outer Surface Second Channel |
| 112 | First Leg Hinge Portion Axle |
| 114 | First Leg Shaft Receiver |
| 116 | First Leg Hinge Portion Rotation Axis |
| 120 | Aperture |
| 122 | First Leg Shaft |
| 124 | First Leg Shaft First End |
| 126 | First Leg Shaft Second End |
| 128 | First Leg Bias Spring Chamber |
| 130 | First Leg Bias Spring |
| 132 | First Leg Bias Spring First End |
| 134 | First Leg Bias Spring Second End |
| 136 | First Leg Bias Spring Holder |
| 138 | First Leg Bias Spring Connector |
| 140 | First Leg Bias Spring Connector First End |
| 142 | First Leg Bias Spring Connector Second End |
| 144 | First Leg Flexible Connector |
| 146 | First Leg Flexible Connector First End |
| 148 | First Leg Flexible Connector Second End |
| 150 | Actuator Pulley Gear Teeth |
| 152 | Lock Lever arm |
| 154 | Lever arm First End |
| 156 | Lever arm Second End |
| 158 | Lever arm Pivot Axle |
| 160 | Lever arm Finger Operator |
| 162 | Lock Bias Spring |
| 164 | Lever arm Secondary Lock Hook |
| 166 | Secondary Lock Catch |
| 168 | Lever arm Engagement Teeth |
| 202 | Second Leg Assembly |
| 204 | Second Leg Hinge Portion |
| 206 | Second Leg Hinge Portion Outer Surface |
| 208 | Second Leg Hinge Portion Outer Surface First Channel |
| 210 | Second Leg Hinge Portion Outer Surface Second Channel |
| 212 | Second Leg Hinge Portion Axle |
| 214 | Second Leg Shaft Receiver |
| 216 | Second Leg Hinge Portion Rotation Axis |
| 220 | Aperture |
| 222 | Second Leg Shaft |
| 224 | Second Leg Shaft First End |
| 226 | Second Leg Shaft Second End |
| 228 | Second Leg Bias Spring Chamber |
| 230 | Second Leg Bias Spring |
| 232 | Second Leg Bias Spring First End |
| 234 | Second Leg Bias Spring Second End |
| 236 | Second Leg Bias Spring Holder |
| 238 | Second Leg Bias Spring Connector |
| 240 | Second Leg Bias Spring Connector First End |
| 242 | Second Leg Bias Spring Connector Second End |
| 244 | Second Leg Flexible Connector |
| 246 | Second Leg Flexible Connector First End |
| 248 | Second Leg Flexible Connector Second End |
| 302 | Second Leg Assembly |
| 304 | Second Leg Hinge Portion |
| 306 | Second Leg Hinge Portion Outer Surface |
| 308 | Second Leg Hinge Portion Outer Surface First Channel |
| 310 | Second Leg Hinge Portion Outer Surface Second Channel |
| 312 | Second Leg Hinge Portion Axle |
| 314 | Second Leg Shaft Receiver |
| 316 | Second Leg Hinge Portion Rotation Axis |
| 320 | Aperture |
| 322 | Second Leg Shaft |
| 324 | Second Leg Shaft First End |
| 326 | Second Leg Shaft Second End |
| 328 | Second Leg Bias Spring Chamber |
| 330 | Second Leg Bias Spring |
| 332 | Second Leg Bias Spring First End |
| 334 | Second Leg Bias Spring Second End |
| 336 | Second Leg Bias Spring Holder |
| 338 | Second Leg Bias Spring Connector |
| 340 | Second Leg Bias Spring Connector First End |

-continued

| Ref. Nr. | Description |
| --- | --- |
| 342 | Second Leg Bias Spring Connector Second End |
| 344 | Second Leg Flexible Connector |
| 346 | Second Leg Flexible Connector First End |
| 348 | Second Leg Flexible Connector Second End |
| 1010 | Second Embodiment |
| 1012 | Rigid Frame Portion |
| 1014 | First Transverse Beam |
| 1016 | Second Transverse Beam |
| 1018 | First Longitudinal Beam |
| 1020 | Second Longitudinal Beam |
| 1022 | Third Longitudinal Beam |
| 1024 | Fourth Longitudinal Beam |
| 1026 | Rigid Frame Portion Top Area |
| 1028 | Rigid Frame Portion Bottom Area |
| 1030 | Load |
| 1040 | First Leg Assembly Hinge Case |
| 1042 | Second Leg Assembly Hinge Case |
| 1044 | Third Leg Assembly Hing Case |
| 1046 | Frame First Bottom Flange |
| 1048 | Second Transfer Shaft Bushing |
| 1050 | Actuator Portion |
| 1052 | Actuator Case |
| 1054 | Actuator Case Top Portion |
| 1056 | Actuator Case Bottom Portion |
| 1058 | Actuator Case Interior Channel |
| 1060 | Actuator Connector |
| 1062 | Actuator Flexible Connector Block |
| 1066 | Actuator Flexible Connector |
| 1072 | Leg Pull Cam |
| 1074 | Leg Pull Cam Long Cam Axis |
| 1076 | Leg Pull Cam Short Cam Axis |
| 1078 | Leg Pull Cam Outer Engagement Surface |
| 1080 | Actuator Portion Manual Pull |
| 1082 | Manual Pull First End |
| 1084 | Manual Pull Second End |
| 1086 | Manual Pull Handle |
| 1088 | Transfer Shaft |
| 1090 | Transfer Shaft First End |
| 1092 | Transfer Shaft Second End |
| 1094 | Transfer Shaft Rotation Axis |
| 1096 | First Transfer Pulley |
| 1098 | Second Transfer Pulley |
| 1100 | Third Transfer Pulley |
| 1102 | First Leg Assembly |
| 1104 | First Leg Hinge Portion |
| 1106 | First Leg Hinge Portion Outer Surface |
| 1108 | First Leg Hinge Portion Outer Surface First Channel |
| 1110 | First Leg Hinge Portion Outer Surface Second Channel |
| 1112 | First Leg Hinge Portion Axle |
| 1114 | First Leg Shaft Receiver |
| 1116 | First Leg Hinge Portion Rotation Axis |
| 1120 | Aperture |
| 1122 | First Leg Shaft |
| 1124 | First Leg Shaft First End |
| 1126 | First Leg Shaft Second End |
| 1128 | First Leg Bias Spring Chamber |
| 1130 | First Leg Bias Spring |
| 1132 | First Leg Bias Spring First End |
| 1134 | First Leg Bias Spring Second End |
| 1136 | First Leg Bias Spring Holder |
| 1138 | First Leg Bias Spring Connector |
| 1140 | First Leg Bias Spring Connector First End |
| 1142 | First Leg Bias Spring Connector Second End |
| 1144 | First Leg Flexible Connector |
| 1146 | First Leg Flexible Connector First End |
| 1148 | First Leg Flexible Connector Second End |
| 1152 | First Locking Member |
| 1154 | Second Locking Member |
| 1156 | Second Locking Member Beveled Hook |
| 1162 | Lock Bias Spring |
| 1170 | Actuator Case Top Portion Bushing Hole |
| 1172 | Actuator Case Bottom Portion Bushing Hole |
| 1174 | Actuator Interior Channel Sidewall |
| 1176 | Actuator Connector Sleeve |
| 1178 | Leg Pull Cam Outer Engagement Surface Channel |
| 1180 | Transfer Shaft First Bushing |
| 1202 | Second Leg Assembly |

-continued

| Ref. Nr. | Description |
|---|---|
| 1204 | Second Leg Hinge Portion |
| 1244 | Second Leg Flexible Connector |
| 1302 | Second Leg Assembly |
| 1304 | Second Leg Hinge Portion |
| 1344 | Second Leg Flexible Connector |
| 2010 | Third Embodiment |
| 2050 | Actuator Portion |
| 2052 | Actuator Case |
| 2054 | Actuator Case First Part |
| 2056 | Actuator Case Second Part |
| 2068 | Actuator Pulley Lock Channel |
| 2070 | Actuator Pulley Lock Channel Detent |
| 2152 | Lock Interference Element Lever Arm |
| 2154 | Lock Lever Arm First End |
| 2156 | Lock Lever Arm Second End |
| 2158 | Lock Lever Arm Pivot Axle |
| 2160 | Lock Lever Arm Finger Operator |
| 2162 | Lock Lever Arm Bias Spring |
| 2164 | Secondary Lock Hook |
| 2166 | Secondary Lock Catch |
| 2168 | Lever Arm Engagement Tooth |
| 2170 | Secondary Lock Sliding Member |
| 2172 | Secondary Lock Sliding Member Finger Pad |
| 2174 | Secondary Lock Sliding Member First Groove |
| 2176 | Secondary Lock Sliding Member Second Groove |
| 3010 | Fourth Embodiment |
| 3012 | Rigid Frame Assembly |
| 3030 | Load/bag |
| 3032 | Load Connector |
| 3034 | Load Connector |
| 3050 | Actuator Portion |
| 3102 | First Leg Assembly |
| 3202 | Second Leg Assembly |
| 3302 | Third Leg Assembly |
| 3402 | Fourth Leg Assembly |

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the description, terms such as "top" and "bottom", "upper" and "lower" and "up" and "down" refer to the orientation when leg assemblies are deployed and set on the ground or a floor. "Deployed position" means the legs are extended to support a load on the frame. "Stowed position" means the legs are folded under the rigid frame portion.

Referring to FIGS. 1-22, a first embodiment of a portable stand 10 is provided. Portable stand 10 includes rigid frame portion 12, actuator portion 50, transfer shaft 88, at least a first leg assembly 102 and a first leg flexible connector 144 synchronously coupling first leg assembly 102 to transfer shaft 88.

Rigid frame portion 12 includes opposed first and second transverse beams 14 and 16, coupled together by longitudinal beams 18, 20, 22 and 24. Rigid frame portion 12 includes a top area 26 and opposite bottom area 28. In the embodiment, rigid frame portion top area 26 is adapted to support a semi-rigid bag 30. Load connectors 32, 34, 36 and 38 are provided to securely connect load 30 to rigid frame portion 12. In the embodiment, load connectors 32, 34, 36 and 38 are straps with hook-and-loop fasteners, and load 30 is shown as a backpack style bag. Hook-and-loop fasteners allow relatively easy attachment and detachment of a load 30 and adequate strength for typical man-portable loads. Other appropriate fastener systems could be used, depending upon the expected usage environment and loads. The described embodiment shows the portable stand 10 supporting a detachable bag 30 which is adapted to connect to load connectors 32, 34, 36 and 38. Alternatively, load 30 may be permanently affixed to rigid frame 12.

Rigid frame portion 12 includes first, second and third leg assembly hinge cases 40, 42 and 44 connected to rigid frame bottom area 28. First leg assembly hinge case 40 is connected across longitudinal beams 18 and 20. Second and third leg assembly hinge cases 42 and 44 are connected across longitudinal beams 22 and 24. Leg assembly hinge cases 40, 42 and 44 provide rigid connection to frame portion 12 for leg assemblies 102, 202 and 302.

Transverse beam 14 includes frame first bottom flange 46, which extends downward from rigid frame portion bottom area 28. Actuator case 52 also extends downward past frame portion bottom area 28. Frame first bottom flange 46 and actuator case 52 extend far enough to shield leg assemblies 102, 202 and 302 when in the stowed position and enable the portable stand 10 to rest on the ground without contacting leg assemblies 102, 202 and 302 when stowed. Transverse beam 14 includes bushing 48 to support transfer shaft second end 92.

Actuator portion 50 includes actuator case 52, actuator pulley 60, actuator pulley gear 66, and transfer shaft actuator gear 72 mounted within the actuator case interior 58, and manual pull 80 operatively coupled to actuator pulley 60. Actuator case 52 is rigidly coupled to rigid frame portion 12 along transvers beam 16. In the embodiment, actuator case 52 and transfer shaft 88 are located at the centerline of rigid frame portion 12, but they can be offset if necessary for a particular load. Spacer 56 provides clearance between actuator portion 50 and bag 30 for ease of operation. In the embodiment, actuator case 52 includes opposed first and second actuator case plates 54 and 56, respectively, defining an actuator case interior 58.

Actuator pulley 60 rotates about actuator pulley rotation axis 62. Actuator pulley outer engagement surface 64 extends around the circumference of actuator pulley 60. Synchronous coupler 66 provides synchronous coupling of actuator pulley 60 to transfer shaft actuator gear 72. In the embodiment, synchronous coupling 66 is an actuator pulley gear concentrically and synchronously coupled to actuator pulley 60, which rotates about actuator pulley rotation axis 62, and therefore rotate together. In the embodiment, actuator pulley 60 and actuator pulley gear 66 comprise a unitary part but may be mounted together by any suitable means.

Transfer shaft actuator gear 72 is mounted proximate to and synchronously engaged with actuator pulley gear 66. Transfer shaft actuator gear 72 rotates about transfer shaft actuator gear rotation axis 74, which is parallel with actuator pulley rotation axis 62. In the embodiment, actuator pulley gear 66 has gear teeth 76 which mesh with transfer shaft actuator gear teeth 78 to ensure synchronous coupling.

Manual pull 80 extends from first end 82 attached to actuator pulley outer engagement surface 64 to a second end 84 attached to pull handle 86 outside actuator case 52. Manual pull 80 is operably coupled to actuator pulley 60, causing actuator pulley 60 to rotate when pulled outward.

Transfer shaft 88 extends longitudinally from first shaft end 90 to second shaft end 92 and rotates about transfer shaft rotation axis 94. Transfer shaft 88 is rotationally coupled to transfer shaft actuator gear 72 proximate transfer shaft first end 90 and rotationally coupled to rigid frame 12 by bushing 48 proximate transfer shaft second end 92. Transfer shaft rotation axis 94 is coextensive with transfer shaft actuator gear rotation axis 74.

First transfer shaft pulley 96 is mounted concentrically around and rotatable with transfer shaft 88 about the transfer shaft rotation axis 94. In the embodiment, second and third transfer pulleys 98 and 100 are mounted concentrically around transfer shaft 88, each transfer pulley 96, 98, 100 synchronously coupled to a corresponding leg assembly 102, 202 and 302.

First leg assembly 102 includes first leg hinge portion 104, first leg shaft 122, first leg bias spring 130, first leg bias spring holder 136, and first leg bias spring connector 138.

First leg hinge portion 104 includes first leg hinge outer surface 106 with first and second engagement channels 108 and 110 extending around at least a portion of the first leg hinge portion outer surface 106, first leg hinge portion axle 112 and first leg shaft receiver 114. First leg hinge portion 104 is rotatably coupled to rigid frame portion 12 at first leg assembly hinge case 40 by first hinge portion axle 112, which defines first leg hinge portion rotation axis 116. First leg shaft receiver 114 extends from first leg hinge portion 104 to provide a connection for first leg shaft 122. First leg hinge portion first channel 108 is in communication with the interior of first leg shaft receiver 114 through aperture 120. Aperture 120 provides the means to route first leg bias spring connector 138 to the interior of first leg shaft receiver 114 and there into the first leg bias spring chamber 128. First leg hinge portion 104 rests against first leg hinge case 40 when deployed, providing support to and defining the maximum rotation of first leg assembly 102. Leg hinge cases 40, 42 and 44 are rigidly connected to the frame elements, so effectively part of the frame.

First leg shaft 122 extends longitudinally from first leg shaft first end 124 to first leg shaft second end 126. First leg shaft 122 is coupled to the first leg shaft receiver 114 proximate the first leg shaft first end 124. First leg bias spring chamber 128 is disposed within first leg shaft 122. First leg bias spring 130 extends from first end 132 to second end 134 and is slidably disposed within first leg bias spring chamber 128 with first end 132 proximate first leg shaft first end 124, allowing first leg bias spring 130 to compress and expand. In the embodiment, first leg bias spring 130 is a coil spring having a diameter approximately equal to the first leg spring chamber 128, which prevents kinking of first leg bias spring 130. First leg bias spring holder 136 is slidingly disposed within first leg bias spring chamber 128 proximate to first leg bias spring second end 134.

First leg bias spring connector 138 extends from first end 140 to second end 142, with first end 140 attached to rigid frame 12 proximate the first leg assembly hinge case 40 and second end 142 attached to first leg bias spring holder 136. First leg bias spring connector 138 is routed within the first leg hinge portion first channel 108, into the interior of first leg shaft receiver 114 through aperture 120, and through first leg bias spring chamber 128 and through first leg bias spring 130 to connect to first leg bias spring holder 136. When the first leg hinge portion 104 rotates about first leg hinge portion axle 112 between a stowed position and a deployed position the first leg bias spring holder 136, being anchored by first leg bias spring connector 138, compresses first leg bias spring 130 within the first leg bias spring chamber 128, storing energy in the spring. When first leg hinge portion 104 is free to rotate between a deployed position and a stowed position, the first leg bias spring 130 pushes against first leg bias spring holder 136 urging first leg assembly 102 to rotate back to and remain in the stowed position. In the embodiment, leg bias springs 130, 230 and 330 have sufficient strength to return leg assemblies 102, 202 and 302 to their stowed position when actuator pulley 60 is released.

First leg flexible connector 144 extends from a first end 146 to a second end 148, with first end 146 operably connected to first transfer pulley 96 and with second end 148 operably connected to first leg hinge portion 104. First leg flexible connector 144 is routed within first leg hinge portion second engagement channel 110 and connected on the distal side of first leg hinge portion 104.

In the embodiment, second and third leg assemblies 202 and 302 are provided which are identical to first leg assembly 102.

Second leg assembly 202 includes second leg hinge portion 204, second leg shaft 222, second leg bias spring 230, second leg bias spring holder 236, and second leg bias spring connector 238. Second leg hinge portion 204 includes second leg hinge outer surface 206 with first and second engagement channels 208 and 210 extending around at least a portion of the second leg hinge portion outer surface 206, second leg hinge portion axle 212 and second leg shaft receiver 214. second leg hinge portion 204 is rotatably coupled to rigid frame portion 12 at second leg assembly hinge case 42 by second hinge portion axle 212, which defines second leg hinge portion rotation axis 216. second leg shaft receiver 214 extends from second leg hinge portion 204 to provide a connection for second leg shaft 222. second leg hinge portion first channel 208 is in communication with the interior of second leg shaft receiver 214 through aperture 220. Aperture 220 provides the means to route second leg bias spring connector 238 to the interior of second leg shaft receiver 214 and there into the second leg bias spring chamber 228. second leg hinge portion 204 rests against second leg hinge case 42 when deployed, providing support to and defining the maximum rotation of second leg assembly 202.

Second leg shaft 222 extends longitudinally from second leg shaft first end 224 to second leg shaft second end 226. second leg shaft 222 is coupled to the second leg shaft receiver 214 proximate the second leg shaft first end 224. second leg bias spring chamber 228 is disposed within second leg shaft 222. second leg bias spring 230 extends from first end 232 to second end 234 and is slidably disposed within second leg bias spring chamber 228 with first end 232 proximate second leg shaft first end 224, allowing second leg bias spring 230 to compress and expand. In the embodiment, second leg bias spring 230 is a coil spring having a diameter approximately equal to the second leg spring chamber 228, which prevents kinking of second leg bias spring 230. second leg bias spring holder 236 is slidingly disposed within second leg bias spring chamber 228 proximate to second leg bias spring second end 234.

Second leg bias spring connector 238 extends from first end 240 to second end 242, with first end 240 attached to rigid frame 12 proximate the second leg assembly hinge case 42 and second end 242 attached to second leg bias spring holder 236. second leg bias spring connector 238 is routed within the second leg hinge portion first channel 208, into the interior of second leg shaft receiver 214 through aperture 220, and through second leg bias spring chamber 228 and through second leg bias spring 230 to connect to second leg bias spring holder 236. When the second leg hinge portion 204 rotates about second leg hinge portion axle 212 between a stowed position and a deployed position the second leg bias spring holder 236, being anchored by second leg bias spring connector 238, compresses second leg bias spring 230 within the second leg bias spring chamber 228, storing energy in the spring. When second leg hinge portion 204 is free to rotate between a deployed position and a stowed position, the second leg bias spring 230 pushes against second leg bias spring holder 236 urging second leg assembly 202 to rotate back to and remain in the stowed position. In the embodiment, leg bias springs 130, 230, 330 have sufficient strength to return leg assemblies 102, 202 and 302 to their stowed position when actuator pulley 60 is released.

Second leg flexible connector 244 extends from a first end 246 to a second end 248, with first end 246 operably connected to second transfer pulley 96 and with second end 248 operably connected to second leg hinge portion 204. second leg flexible connector 244 is routed within second leg hinge portion second engagement channel 210 and connected on the distal side of second leg hinge portion 204.

Third leg assembly 302 includes third leg hinge portion 304, third leg shaft 322, third leg bias spring 330, third leg bias spring holder 336, and third leg bias spring connector 338. third leg hinge portion 304 includes third leg hinge outer surface 306 with first and second engagement channels 308 and 310 extending around at least a portion of the third leg hinge portion outer surface 306, third leg hinge portion axle 312 and third leg shaft receiver 314. third leg hinge portion 304 is rotatably coupled to rigid frame portion 12 at third leg assembly hinge case 42 by third hinge portion axle 312, which defines third leg hinge portion rotation axis 316. third leg shaft receiver 314 extends from third leg hinge portion 304 to provide a connection for third leg shaft 322. third leg hinge portion first channel 308 is in communication with the interior of third leg shaft receiver 314 through aperture 320. Aperture 320 provides the means to route third leg bias spring connector 338 to the interior of third leg shaft receiver 314 and there into the third leg bias spring chamber 328. third leg hinge portion 304 rests against third leg hinge case 44 when deployed, providing support to and defining the maximum rotation of third leg assembly 302.

third leg shaft 322 extends longitudinally from third leg shaft first end 324 to third leg shaft second end 326. third leg shaft 322 is coupled to the third leg shaft receiver 314 proximate the third leg shaft first end 324. third leg bias spring chamber 328 is disposed within third leg shaft 322. third leg bias spring 330 extends from first end 332 to second end 334 and is slidably disposed within third leg bias spring chamber 328 with first end 332 proximate third leg shaft first end 324, allowing third leg bias spring 330 to compress and expand. In the embodiment, third leg bias spring 330 is a coil spring having a diameter approximately equal to the third leg spring chamber 328, which prevents kinking of third leg bias spring 330. third leg bias spring holder 336 is slidingly disposed within third leg bias spring chamber 328 proximate to third leg bias spring second end 334.

third leg bias spring connector 338 extends from first end 340 to second end 342, with first end 340 attached to rigid frame 12 proximate the third leg assembly hinge case 44 and second end 342 attached to third leg bias spring holder 336. third leg bias spring connector 338 is routed within the third leg hinge portion first channel 308, into the interior of third leg shaft receiver 314 through aperture 320, and through third leg bias spring chamber 328 and through third leg bias spring 330 to connect to third leg bias spring holder 336. When the third leg hinge portion 304 rotates about third leg hinge portion axle 312 between a stowed position and a deployed position the third leg bias spring holder 336, being anchored by third leg bias spring connector 338, compresses third leg bias spring 330 within the third leg bias spring chamber 328, storing energy in the spring. When third leg hinge portion 304 is free to rotate between a deployed position and a stowed position, the third leg bias spring 330 pushes against third leg bias spring holder 336 urging third leg assembly 302 to rotate back to and remain in the stowed position. In the embodiment, leg bias springs 130, 230, 330 have sufficient strength to return leg assemblies 102, 202 and 302 to their stowed position when actuator pulley 60 is released.

third leg flexible connector 344 extends from a first end 346 to a second end 348, with first end 346 operably connected to third transfer pulley 96 and with second end 348 operably connected to third leg hinge portion 304. third leg flexible connector 344 is routed within third leg hinge portion second engagement channel 310 and connected on the distal side of third leg hinge portion 304.

Referring to FIGS. 13-16, 19 and 22A-B, the described embodiment includes an actuator lock with an interference element 152 mounted through actuator case 52. In the embodiment, actuator lock interference element is a lever arm 152 extending from first end 154 to a second end 156, with pivot axle 158 disposed between first and second ends 154 and 156. Engagement teeth 168 are located proximate second end 156 to engage actuator pulley gear teeth 150 on actuator pulley gear 66. Lever arm 152 includes a finger operator 160 proximate first end 154 which projects outside actuator case 50. Bias spring 162 urges lever arm second end 156 toward actuator pulley gear 66 unless finger operator 160 is depressed or locked open.

In the embodiment, actuator portion 50 includes a secondary lock to positively lock lever arm 152 open or disengaged. Lever arm 152 includes hook 164, which can be selectively engaged by catch 166 which the operator may rotate into place to engage hook 164 to hold lever arm 152 in the disengaged position, allowing actuator pulley 60 to move freely between stowed and deployed positions and allowing leg bias springs 130, 230 and 330 to push the legs closed when unloaded by lifting the stand 10 from the ground.

In operation, an operator pulls on actuator manual pull 80, which causes actuator pulley 60 to rotate. Rotation of actuator pulley 60 with the actuator pulley gear 66 about the actuator pulley rotation axis 62 between a stowed position and a deployed position causes synchronous rotation of transfer shaft actuator gear 72, transfer shaft 88 and transfer pulleys 96, 98 and 100 about the transfer shaft rotation axis 94. Leg flexible connectors 144, 244 and 344 transfer the transfer shaft 88 rotation to leg assembly hinge portions 104, 204 and 304, causing them to synchronously rotate about their respective hinge portion rotation axes 116, 216 and 316 from a stowed to a deployed position. Leg assembly bias spring holders 136, 236 and 336, anchored to rigid frame 12, compress leg bias springs 130, 230 and 330 within their respective leg bias spring chambers. Actuator portion 50 may either be locked in place, or the portable stand 10 set on its legs on the ground wherein the load weight will hold them in their deployed positions. To return to the stowed condition, actuator portion 50 is unlocked and stand 10 is raised from the ground, so that leg bias springs 130, 230 and 330 will decompress by pushing back against leg bias spring holders 136, 236 and 336 and reversing the leg movement back to their stowed positions.

The gear ratios of actuator pulley 60, actuator pulley gear 66 and transfer shaft actuator gear 72 can be selected to provide any desired mechanical advantage, balanced against the fact that the range of motion of a manual operator 80 would be greater to achieve a greater mechanical advantage.

Referring to FIGS. 23-42 a second embodiment of a portable stand 1010 is shown. Portable stand 1010 includes rigid frame portion 1012, actuator flexible connector block 1062 connected to rigid frame portion 1012, actuator portion 1050, leg pull cam 1072, transfer shaft 1088, first transfer pulley 1096, first leg assembly 1102 and first leg flexible connector 1144 synchronously coupling first leg assembly 1102 to transfer shaft 1088 at first transfer pulley 1096.

Rigid frame portion 1012 includes opposed first and second transverse beams 1014 and 1016, coupled together by longitudinal beams 1018, 1020, 1022 and 1024. Rigid frame portion 1012 includes a top area 1026 and opposite bottom area 1028. In the embodiment, rigid frame portion top area 1026 is adapted to support a semi-rigid bag 1030. In the embodiment, load 1030 is shown as a backpack style bag with an internal frame to attach actuator case 1052.

Rigid frame portion 1012 includes first, second and third leg assembly hinge cases 1040, 1042 and 1044 connected to rigid frame bottom area 1028. First leg assembly hinge case 1040 is connected across longitudinal beams 1018 and 1020. Second and third leg assembly hinge cases 1042 and 1044 are connected across longitudinal beams 1022 and 1024. Leg assembly hinge cases 1040, 1042 and 1044 provide rigid connection to frame portion 1012 for leg assemblies 1102, 1202 and 1302. Transverse beam 1014 includes frame first bottom flange 1046, which extends downward from rigid frame portion bottom area 1028.

Actuator case 1052 is connectable to a load 1030, such as a backpack frame, suitcase or other load. Alternatively, actuator case 1052 may be inserted into a sleeve or similarly stored with or within load 1030. Actuator case 1052 may be rigidly connected to rigid frame portion 1012 as well.

Actuator portion 1050 includes actuator case 1052, manual pull 1080 operatively coupled to leg pull cam 1072. Actuator case 1052 includes top portion 1054 with a top portion bushing hole 1170, bottom portion 1056 with bottom portion bushing hole 1172, and interior channel 1058. Manual pull 1080 extends from first end 1082 to second end 1084. Manual pull 1080 extends through actuator case top bushing hole 1170 for the operator to grasp operating handle 1086 connected to manual pull first end 1082. Manual pull second end 1084 is connected to actuator connector 1060 within actuator case interior channel 1058, and slides within interior channel 1058. In the embodiment, manual pull 1080 is a rigid shaft, and actuator connector 1060 is configured like a piston head or linear bearing which maintains contact with the interior channel sidewall 1174 to maintain alignment and prevent kinking of actuator flexible connector 1066.

Manual pull 1080 includes a first locking member 1152 proximate manual pull second end 1084. In the embodiment, first locking member 1152 is a first beveled hook disposed on actuator connector 1060. Second locking member 1154 is mounted to the actuator case top portion and projects out to be manually accessible. Second locking member 1154 is a lever arm with a second beveled hook 1156 to engage first beveled hook 1152. Locking member bias spring 1162 is biased against second locking member 1154 so second locking member 1154 automatically engages first locking member 1152 when manual pull reaches the fully deployed position.

Actuator connector sleeve 1176 extends from actuator case bottom portion bushing hole 1172 to actuator flexible connector block 1062. Actuator connector 1066 is routed to actuator flexible connector block 1062 within actuator connector sleeve 1176 to protect actuator flexible connector 1066, and then through flexible connector block 1062 along leg pull cam outer engagement surface 1078 and within leg pull cam channel 1178, where it connects to leg pull cam 1072 at its distal end, corresponding to the leg pull cam long axis 1074.

Leg pull cam 1072 is mounted eccentrically to and rotatable with transfer shaft 1088 about the transfer shaft rotation axis 1094, leg pull cam "eccentricity" defining a long cam axis 1074 and a short cam axis 1076. Leg pull cam includes a curved outer engagement surface 1078 extending from leg pull cam long axis 1074 to leg pull cam short axis 1076. Leg cam outer engagement surface 1078 includes leg pull cam channel 1178. Leg pull cam 1072 is mounted to transfer shaft 1088 with long cam axis 1074 oriented away from actuator flexible connector block 1062 while in the stowed position to provide large range of motion to deploy leg assemblies 1102, 1202 and 1302, but reducing the exposed profile of leg pull cam 1072 when in the stowed position.

Transfer shaft 1088 extends longitudinally from first shaft end 1090 to second shaft end 1092 and rotates about transfer shaft rotation axis 1094. Transfer shaft 1088 is rotationally coupled to first transverse beam 1014 by first transfer shaft bushing 1180 proximate transfer shaft first end 1090 and rotationally coupled to rigid frame 1012 by second transfer shaft bushing 1048 proximate transfer shaft second end 1092. Transfer shaft rotation axis 1094 is coextensive with the leg pull cam 1072 rotation axis.

First transfer shaft pulley 1096 is mounted concentrically around and rotatable with transfer shaft 1088 about the transfer shaft rotation axis 1094. In the embodiment, second and third transfer pulleys 1098 and 1100 are mounted concentrically around transfer shaft 1088, each transfer pulley 1096, 1098, 1100 synchronously coupled to a corresponding leg assembly 1102, 1202 and 1302.

Leg assemblies 1102, 1202 and 1302 are identical, so only first leg assembly 1102 is described in detail. First leg assembly 1102 includes first leg hinge portion 1104, first leg shaft 1122, first leg bias spring 1130, first leg bias spring holder 1136, and first leg bias spring connector 1138.

First leg hinge portion 1104 includes first leg hinge outer surface 1106 with first and second engagement channels 1108 and 1110 extending around at least a portion of the first leg hinge portion outer surface 1106, first leg hinge portion axle 1112 and first leg shaft receiver 1114. First leg hinge portion 1104 is rotatably coupled to rigid frame portion 1012 at first leg assembly hinge case 1040 by first hinge portion axle 1112, which defines first leg hinge portion rotation axis 1116. First leg shaft receiver 1114 extends from first leg hinge portion 1104 to provide a connection for first leg shaft 1122. First leg hinge portion first channel 1108 is in communication with the interior of first leg shaft receiver 1114 through aperture 1120. Aperture 1120 provides the means to route first leg bias spring connector 1138 to the interior of first leg shaft receiver 1114 and there into the first leg bias spring chamber 1128. First leg hinge portion 1104 rests against first leg hinge case 1040 when deployed, providing support to and defining the maximum rotation of first leg assembly 1102. Leg hinge cases 1040, 1042 and 1044 are rigidly connected to the frame elements, so effectively part of rigid frame portion 1012.

First leg shaft 1122 extends longitudinally from first leg shaft first end 1124 to first leg shaft second end 1126. First leg shaft 1122 is coupled to the first leg shaft receiver 1114 proximate the first leg shaft first end 1124. First leg bias spring chamber 1128 is disposed within first leg shaft 1122. First leg bias spring 1130 extends from first end 1132 to second end 1134 and is slidably disposed within first leg bias spring chamber 1128 with first end 1132 proximate first leg shaft first end 1124, allowing first leg bias spring 1130 to compress and expand. In the embodiment, first leg bias spring 1130 is a coil spring having a diameter approximately equal to the first leg bias spring chamber 1128, which prevents kinking of first leg bias spring 1130. First leg bias spring holder 1136 is slidingly disposed within first leg bias spring chamber 1128 proximate to first leg bias spring second end 1134.

First leg bias spring connector 1138 extends from first end 1140 to second end 1142, with first end 1140 attached to rigid frame 1012 proximate the first leg assembly hinge case 1040 and second end 1142 attached to first leg bias spring holder 1136. First leg bias spring connector 1138 is routed within the first leg hinge portion first channel 1108, into the interior of first leg shaft receiver 1114 through aperture 1120, and through first leg bias spring chamber 1128 and through first leg bias spring 1130 to connect to first leg bias spring holder 1136. When the first leg hinge portion 1104 rotates about first leg hinge portion axle 1112 between a stowed position and a deployed position the first leg bias spring holder 1136, being anchored by first leg bias spring connector 1138, compresses first leg bias spring 1130 within the first leg bias spring chamber 1128, storing energy in the spring. When first leg hinge portion 1104 is free to rotate between a deployed position and a stowed position, the first leg bias spring 1130 pushes against first leg bias spring holder 1136 urging first leg assembly 1102 to rotate back to and remain in the stowed position. In the embodiment, leg bias springs 1130, 1230 and 1330 have sufficient strength to return leg assemblies 1102, 1202 and 1302 to their stowed position when actuator portion manual pull 1080 is released.

First leg flexible connector 1144 extends from a first end 1146 to a second end 1148, with first end 1146 operably connected to first transfer pulley 1096 and with second end 1148 operably connected to first leg hinge portion 1104. First leg flexible connector 1144 is routed within first leg hinge portion second engagement channel 1110 and connected on the distal side of first leg hinge portion 1104.

In the embodiment, second and third leg assemblies 1202 and 1302 are provided which are identical to first leg assembly 1102. Second transfer pulley 1098, connected to and synchronous with transfer shaft 1088, is operably coupled to second leg hinge portion 1204 by second flexible leg connector 1244. Third transfer pulley 1100, connected to and synchronous with transfer shaft 1088, is operably coupled to third leg hinge portion 1304 by third flexible leg connector 1344.

In operation, moving the actuator portion manual pull 1080 between the stowed position (FIG. 25) and the deployed position (FIG. 26, 32) causes actuator flexible connector 1066 to rotate leg pull cam 1072, thereby causing synchronous rotation of transfer shaft 1088 and transfer pulleys 1096, 1098 and 1100 about the transfer shaft rotation axis 1094, and further causes the leg hinge portions 1104, 1204 and 1304 to synchronously rotate between their stowed positions and their deployed positions. When manual pull 1080 is fully extended, first and second locking members 1152 and 1154 automatically engage to maintain the deployed position. Rotating leg assemblies 1102, 1202 and 1302 to their deployed positions compresses their leg assembly bias springs. When first and second locking members 1152 and 1154 are released, leg assemblies 1102, 1202 and 1302 automatically rotated back to their stowed positions by collective force from the leg assembly bias springs.

Figure 43:
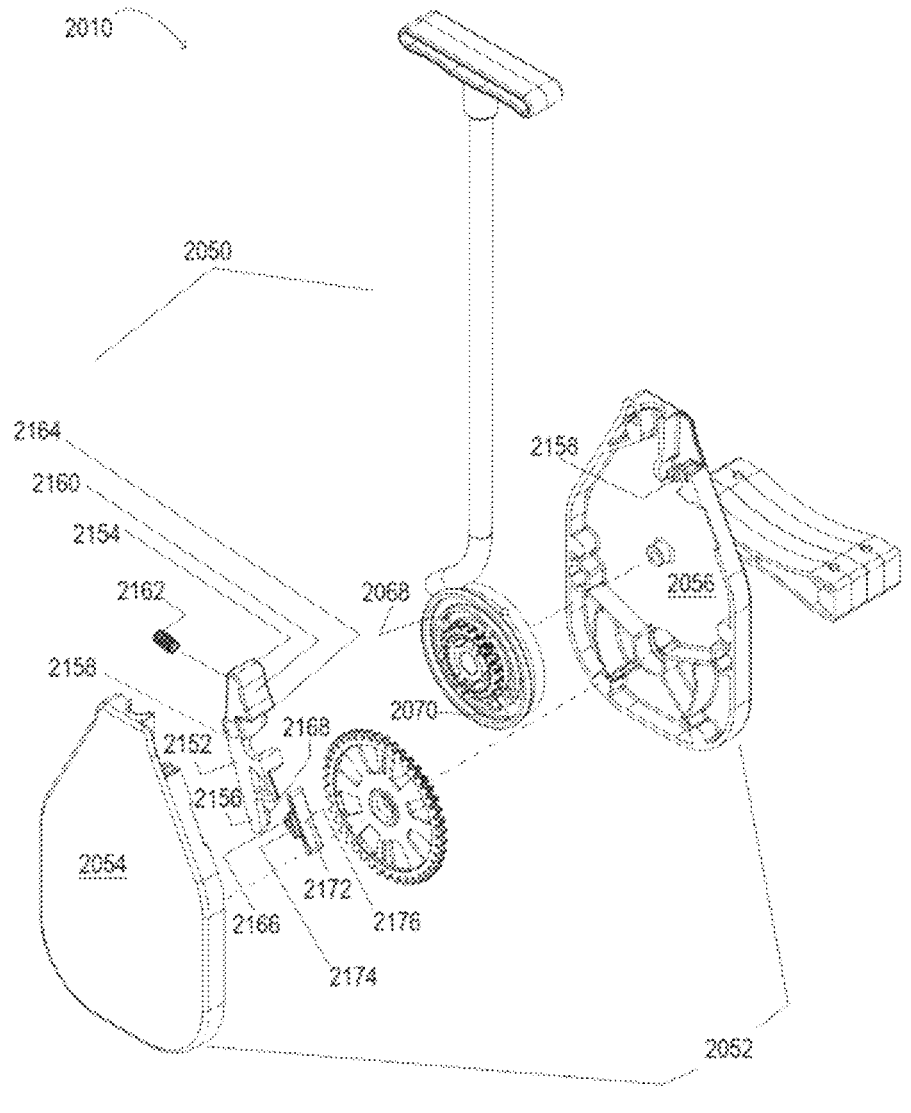
FIG. 43 shows an exploded view of an actuator of a third embodiment.

Referring to FIG. 43, an actuator portion 2050 of a third embodiment of a portable stand 2010 is shown. Portable stand 2010 is generally identical the first described embodiment portable stand 10, but with a modified actuator lock and secondary lock. Portable stand 2010 includes an actuator lock with an interference element 2152 mounted through actuator case 2052. In the embodiment, actuator lock interference element is a lever arm 2152 extending from first end 2154 to a second end 2156, with pivot axle 2158 disposed between first and second ends 2154 and 2156. Lever arm engagement tooth 2168 is located proximate second end 2156 to actuator pulley lock channel detent 2070 along actuator pulley lock channel 2068. Lever arm 2152 includes a finger operator 2160 proximate first end 2154 which projects outside actuator case 2050. Bias spring 2162 is mounted within a cavity in lever arm 2152 proximate lever arm first end 2154 and engages outwardly against lever arm first end 2154 to urges lever arm second end 2156 toward actuator pulley lock channel detent 2070 unless finger operator 2160 is depressed or locked open.

In the embodiment, actuator portion 2050 includes a secondary lock to positively lock lever arm 2152 open or disengaged. Lever arm 2152 includes secondary lock hook 2164, which can be selectively engaged by secondary lock catch 2166 on secondary lock sliding member 2170. Secondary lock sliding member 2170 includes opposite first and second grooves 2174 and 2176 which slidingly engage against actuator case first and second parts 2054 and 2056. Finger pad 2172 projects outside actuator case 2052, allowing the operator to selectively engage secondary lock sliding member 2170 and lock lever arm 2152 in the disengaged position, thereby allowing actuator pulley 2060 to move freely between deployed and stowed positions and allowing leg bias springs (not shown) to push the leg assemblies (not shown) closed when unloaded by lifting the stand 2010 from the ground.

Figure 44:
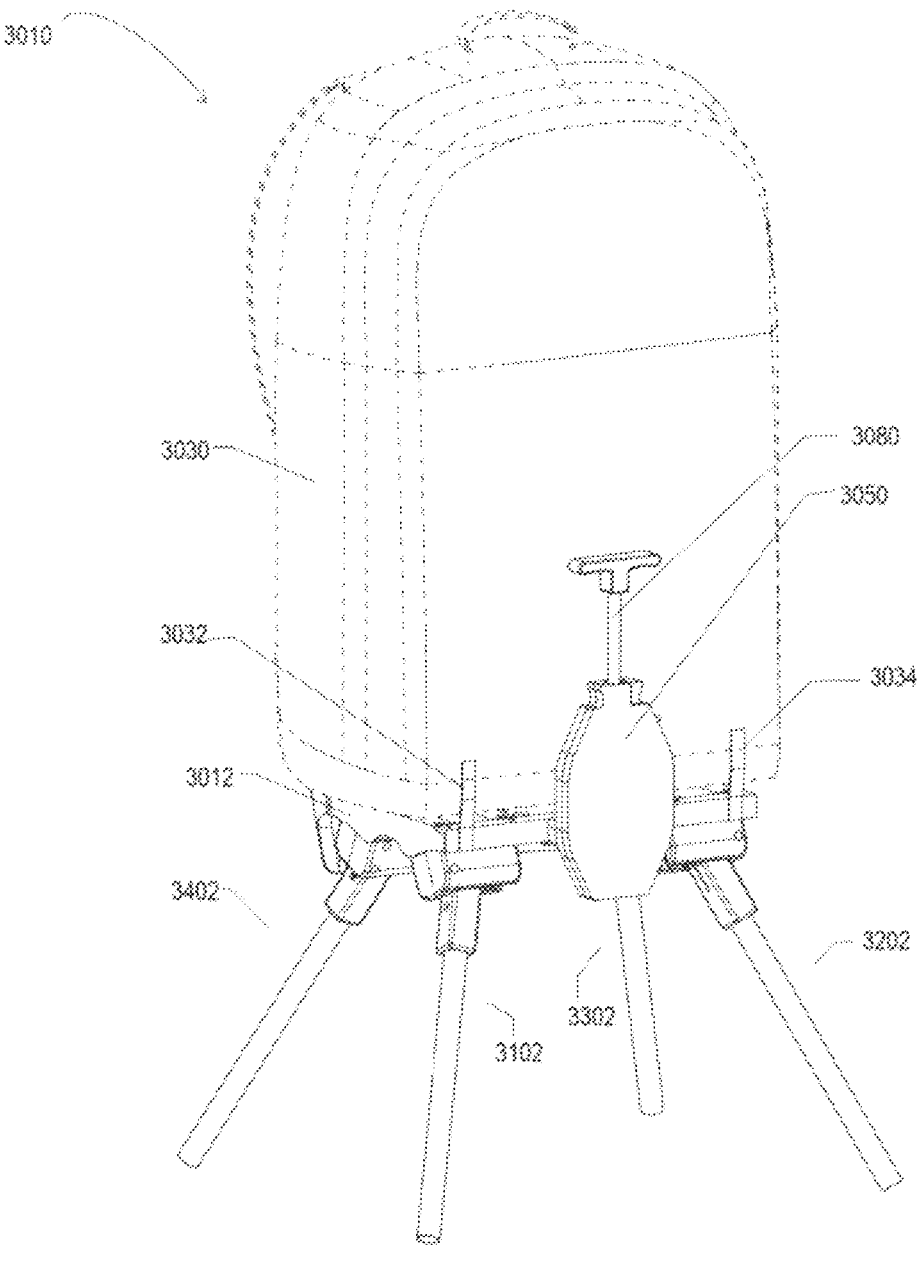
FIG. 44 shows a perspective view of a fourth embodiment.

Referring to FIG. 44, a fourth described embodiment of a portable stand 3010 is identical to the first described embodiment 10 but includes a fourth leg assembly 3402. The fourth embodiment includes rigid frame portion 3012, first, second, third and fourth leg assemblies 3102, 3202, 3302 and 3402 rotatably connected to rigid fame portion 3012, actuator portion 3050 connected to rigid frame portion 3012 and including actuator portion manual pull 3080, load connectors 3032 and 3034 (additional connectors not visible in view) to connect load 3030 (shown as a bag or case) to rigid frame portion 3012.

A portable stand 10, 1010 or 2010 may include one or two leg assemblies to act as a simple support (for example as a simple prop or to provide support to a cantilevered mounting), or may include a plurality of three or four or more leg assemblies. Typically, a configuration with three or four leg assemblies would be selected, providing an advantage of adequate stability but with low weight.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. A portable stand, comprising a rigid frame portion, an actuator portion synchronously coupled to a transfer shaft, a first transfer shaft pulley, a first leg assembly, and a first leg flexible connector synchronously coupling the first leg assembly to the transfer shaft;

the rigid frame portion including a top area and opposite bottom area, and a first leg assembly hinge case connected to the rigid frame portion bottom area;

the actuator portion including an actuator case rigidly coupled to the rigid frame portion, the actuator portion further including an actuator pulley, a synchronous coupler engaging the actuator pulley to a transfer shaft actuator gear mounted within the actuator case, an actuator lock, and a manual pull;

the actuator pulley defining and rotatable about an actuator pulley rotation axis, the actuator pulley defining an actuator pulley circumference and having an actuator pulley outer engagement surface extending around the actuator pulley circumference, the synchronous coupler concentrically and synchronously coupled to the actuator pulley and rotatable about a actuator pulley rotation axis;

the transfer shaft actuator gear defining and rotatable about a transfer shaft actuator gear rotation axis, the transfer shaft actuator gear synchronously engaged with the synchronous coupler;

the actuator lock mounted through the actuator case and including an interference element, the actuator lock selectively engageable between an unlocked position and a locked position wherein the interference element engages against the actuator pulley;

the manual pull extending outside the actuator case and operably coupled to the actuator pulley;

the transfer shaft extending longitudinally from a first shaft end to a second shaft end and rotatable about a transfer shaft rotation axis, the transfer shaft rotationally coupled to the transfer shaft actuator gear proximate the transfer shaft first end and to the rigid frame proximate the transfer shaft second end, the transfer shaft rotation axis coextensive with the transfer shaft actuator gear rotation axis;

the first transfer shaft pulley mounted concentrically around and rotatable with the transfer shaft about the transfer shaft rotation axis;

the first leg assembly comprising a first leg hinge portion, a first leg shaft, a first leg bias spring, a first leg bias spring holder, and a first leg bias spring connector;

the first leg hinge portion including a first leg hinge outer surface with first and second engagement channels extending around at least a portion of the first leg hinge portion outer surface, a first leg hinge portion axle and a first leg shaft receiver including a first leg shaft receiver interior, the first leg hinge portion first channel in communication with the first leg hinge portion shaft receiver interior, the first leg hinge portion rotatably coupled to the frame first leg hinge case at the first leg hinge portion axle to rotate between a stowed position and a deployed position, the first leg hinge portion axle defining a first leg hinge portion rotation axis;

the first leg shaft extending longitudinally from a first leg shaft first end to a first leg shaft second end, the first leg shaft coupled to the first leg shaft receiver proximate the first leg shaft first end, the first leg shaft including a first leg bias spring chamber;

the first leg bias spring extending from a first leg bias spring first end to a first leg bias spring second end, the first leg bias spring slidingly disposed within the first leg bias spring chamber with the first leg bias spring first end proximate the first leg shaft first end;

the first leg bias spring holder slidingly disposed within the first leg bias spring chamber proximate the first leg bias spring second end; and, the first leg bias spring connector extending from a first end to a second end, the first leg bias spring connector first end fixedly attached to the frame proximate the first leg assembly hinge case, the first leg bias spring connector second end attached to the first leg bias spring holder, the first leg bias spring connector routed within the first leg hinge portion first channel and through the first leg receiver and first leg bias spring chamber, wherein when the first leg hinge portion rotates between a stowed position and a deployed position the first leg bias spring holder compresses the first leg bias spring within the first leg bias spring chamber and when the first leg hinge portion rotates between a deployed position and a stowed position the first leg bias spring holder allows the first leg bias spring to decompress;

the first leg flexible connector extending from a first end to a second end, the first leg flexible connector first end operably connected to the first transfer shaft pulley and the first leg flexible connector second end operably connected to the first leg hinge portion, the first leg flexible connector routed within the first leg hinge portion second engagement channel;

wherein, rotation of the actuator pulley with the synchronous coupler about the actuator pulley rotation axis between a stowed position and a deployed position causes synchronous rotation of the transfer shaft actuator gear and transfer shaft about the transfer shaft actuator gear and transfer shaft rotation axes, and further causes the first leg hinge portion to synchronously rotate about the first leg hinge portion rotation axis between a stowed position and a deployed position.

2. The portable stand as in claim 1, further comprising:

the rigid frame further including a second leg assembly hinge case;

a second transfer shaft pulley mounted concentrically around and rotatable with the transfer shaft about the transfer shaft rotation axis;

a second leg assembly, and a second leg flexible connector synchronously coupling the second leg assembly to the transfer shaft;

the second leg assembly comprising a second leg hinge portion, a second leg shaft, a second leg bias spring, a second leg bias spring holder, and a second leg bias spring connector;

the second leg hinge portion including a second leg hinge outer surface with first and second engagement channels extending around at least a portion of the second leg hinge portion outer surface, a second leg hinge portion axle and a second leg shaft receiver including a second leg shaft receiver interior, the second leg hinge portion first channel in communication with the second leg hinge portion shaft receiver interior, the second leg hinge portion rotatably coupled to the frame second leg hinge case at the second leg hinge portion axle to rotate between a stowed position and a deployed position, the second leg hinge portion axle defining a second leg hinge portion rotation axis;

the second leg shaft extending longitudinally from a second leg shaft first end to a second leg shaft second end, the second leg shaft coupled to the second leg shaft receiver proximate the second leg shaft first end, the second leg shaft including a second leg bias spring chamber;

the second leg bias spring extending from a second leg bias spring first end to a second leg bias spring second end, the second leg bias spring slidingly disposed within the second leg bias spring chamber with the second leg bias spring first end proximate the second leg shaft first end;

the second leg bias spring holder slidingly disposed within the second leg bias spring chamber proximate the second leg bias spring second end; and, the second leg bias spring connector extending from a first end to a second end, the second leg bias spring connector first end fixedly attached to the frame proximate the second leg assembly hinge case, the second leg bias spring connector second end attached to the second leg bias spring holder, the second leg bias spring connector routed within the second leg hinge portion first channel and through the second leg receiver and second leg bias spring chamber, wherein when the second leg hinge portion rotates between a stowed position and a deployed position the second leg bias spring holder compresses the second leg bias spring within the second leg bias spring chamber and when the second leg hinge portion rotates between a deployed position and a stowed position the second leg bias spring holder allows the second leg bias spring to decompress;

the second leg flexible connector extending from a first end to a second end, the second leg flexible connector first end operably connected to the second transfer shaft pulley and the second leg flexible connector second end operably connected to the second leg hinge portion, the second leg flexible connector routed within the second leg hinge portion second engagement channel;

wherein, rotation of the actuator pulley with the synchronous coupler about the actuator pulley rotation axis between a stowed position and a deployed position causes synchronous rotation of the transfer shaft actuator gear and transfer shaft about the transfer shaft actuator gear and transfer shaft rotation axes, and further causes the second leg hinge portion to synchronously rotate about the second leg hinge portion rotation axis between a stowed position and a deployed position.

3. The portable stand as in claim 2, further comprising:

the rigid frame further including a third leg assembly hinge case;

a third transfer shaft pulley mounted concentrically around and rotatable with the transfer shaft about the transfer shaft rotation axis;

a third leg assembly, and a third leg flexible connector synchronously coupling the third leg assembly to the transfer shaft;

the third leg assembly comprising a third leg hinge portion, a third leg shaft, a third leg bias spring, a third leg bias spring holder, and a third leg bias spring connector;

the third leg hinge portion including a third leg hinge outer surface with first and second engagement channels extending around at least a portion of the third leg hinge portion outer surface, a third leg hinge portion axle and a third leg shaft receiver including a third leg shafter receiver interior, the third leg hinge portion first channel in communication with the third leg hinge portion shaft receiver interior, the third leg hinge portion rotatably coupled to the frame third leg hinge case at the third leg hinge portion axle to rotate between a stowed position and a deployed position, the third leg hinge portion axle defining a third leg hinge portion rotation axis;

the third leg shaft extending longitudinally from a third leg shaft first end to a third leg shaft second end, the third leg shaft coupled to the third leg shaft receiver proximate the third leg shaft first end, the third leg shaft including a third leg bias spring chamber;

the third leg bias spring extending from a third leg bias spring first end to a third leg bias spring second end, the third leg bias spring slidingly disposed within the third leg bias spring chamber with the third leg bias spring first end proximate the third leg shaft first end;

the third leg bias spring holder slidingly disposed within the third leg bias spring chamber proximate the third leg bias spring second end; and, the third leg bias spring connector extending from a first end to a second end, the third leg bias spring connector first end fixedly attached to the frame proximate the third leg assembly hinge case, the third leg bias spring connector second end attached to the third leg bias spring holder, the third leg bias spring connector routed within the third leg hinge portion first channel and through the third leg receiver and third leg bias spring chamber, wherein when the third leg hinge portion rotates between a stowed position and a deployed position the third leg bias spring holder compresses the third leg bias spring within the third leg bias spring chamber and when the third leg hinge portion rotates between a deployed position and a stowed position the third leg bias spring holder allows the third leg bias spring to decompress;

the third leg flexible connector extending from a first end to a second end, the third leg flexible connector first end operably connected to the third transfer shaft pulley and the third leg flexible connector second end operably connected to the third leg hinge portion, the third leg flexible connector routed within the third leg hinge portion second engagement channel;

wherein, rotation of the actuator pulley with the synchronous coupler about the actuator pulley rotation axis between a stowed position and a deployed position causes synchronous rotation of the transfer shaft actuator gear and transfer shaft about the transfer shaft actuator gear and transfer shaft rotation axes, and further causes the third leg hinge portion to synchronously rotate about the third leg hinge portion rotation axis between a stowed position and a deployed position.

4. The portable stand as in claim 1, further comprising:
a plurality of leg assemblies;
a plurality of transfer shaft pulleys, each of the transfer shaft pulley corresponding to one of the plurality of leg assemblies;
a plurality of leg flexible connectors, each of the leg flexible connectors coupling one of the plurality of leg assemblies to a corresponding transfer shaft pulley to synchronously couple each of the plurality of leg assemblies to the transfer shaft.

5. The portable stand as in claim 1, further comprising:
the transfer shaft actuator gear including a plurality of transfer shaft actuator gear teeth, and further wherein the synchronous coupler comprises an actuator pulley gear mounted concentrically to the actuator pulley and having a rotation axis coextensive with the actuator pulley, the actuator pulley gear including a plurality of actuator pulley gear teeth, the actuator pulley gear teeth synchronously meshed with the transfer shaft actuator gear teeth.

6. The portable stand as in claim 1, further comprising:
the actuator portion including an actuator lock,
the actuator lock including an interference member mounted through the actuator case and selectively engageable between an unlocked position and a locked position.

7. The portable stand as in claim 6, further comprising:
the actuator lock interference member comprising:
a lever arm extending from a lever arm first end to a lever arm second end and including a lever arm axle disposed between the lever arm first and second ends, the lever arm first end projecting out from the actuator case, a lever arm operator disposed proximate the lever arm first end, and lever arm engagement member disposed proximate to the lever arm second end to engage the actuator pulley; and,
a lever arm bias spring engaged against the lever arm to urge the lever arm to the locked position;
the lever arm selectively engageable between an unlocked position and a locked position engaged against the actuator pulley, the bias spring engaged against the lever arm to bias the lever arm toward the locked position.

8. The portable stand as in claim 6, further comprising:
the actuator pulley including an actuator lock channel, the actuator lock channel concentric with the actuator pulley outer engagement surface and including a detent to engage with the actuator lock interference member when the actuator pulley is rotated to a deployed position.

9. The portable stand as in claim 7, further comprising:
the actuator pulley including an actuator lock channel, the actuator lock channel concentric with the actuator pulley outer engagement surface and including a detent to engage with the actuator lock interference member when the actuator pulley is rotated to a deployed position.

10. The portable stand as in claim 8, further comprising:
the actuator portion including a secondary lock, comprising:
a hook disposed on the actuator lock lever arm;
a manually operable catch extending through the actuator case, the catch adapted to engage the lever arm hook to hold the lever arm in the disengaged position.

11. The portable stand as in claim 9, further comprising:
the actuator portion including a secondary lock, comprising:
a hook disposed on the actuator lock lever arm;
a manually operable catch extending through the actuator case, the catch adapted to engage the lever arm hook to hold the lever arm in the disengaged position.

12. A portable stand as in claim 10, further comprising
the secondary lock including opposed first and second grooves slidingly engaged to the actuator case proximate the actuator lock lever arm, the secondary lock further including a finger operator projecting outside the actuator case and a hook selectively engageable with the actuator lock lever arm first portion catch, the secondary lock selectively movable between a first disengaged position and a second engaged position wherein the secondary lock hook engages the actuator lock lever arm first portion catch, thereby retaining the actuator lock lever arm in the disengaged position.

13. A portable stand as in claim 11, further comprising
the secondary lock including opposed first and second grooves slidingly engaged to the actuator case proximate the actuator lock lever arm, the secondary lock further including a finger operator projecting outside the actuator case and a hook selectively engageable with the actuator lock lever arm first portion catch, the secondary lock selectively movable between a first disengaged position and a second engaged position wherein the secondary lock hook engages the actuator lock lever arm first portion catch, thereby retaining the actuator lock lever arm in the disengaged position.

14. A portable stand as in claim 1, further comprising:
a plurality of load connectors mounted to the rigid frame portion to removably connect a load to the rigid frame.

15. A portable stand as in claim 14, further comprising:
a backpack adapted to be removably connectable to the rigid frame by the plurality of load connectors.

16. A portable stand as in claim 14, further comprising:
a backpack, the rigid frame permanently connected to the backpack.

17. A portable stand, comprising a rigid frame portion, an actuator portion, a transfer shaft, a leg pull cam, a transfer pulley, an actuator flexible connector, an actuator flexible connector block, a first leg assembly, and a first leg flexible connector synchronously coupling the first leg assembly to the transfer shaft;
the rigid frame portion including a top area and opposite bottom area, and a first leg assembly hinge case connected to the rigid frame portion bottom area;
the actuator flexible connector block rigidly connected to the rigid frame portion;
the actuator portion including an actuator case, a manual pull, and an operating handle;
the actuator case including an interior channel, a top portion, a bottom portion, a top portion bushing hole and a bottom portion bushing hole;
the manual pull extending from a first end extending out of the actuator case top portion through the top portion bushing hole to a second end within the actuator case interior channel, the manual pull second end coupled to an actuator connector slidingly disposed in the actuator case interior channel and movable between a stowed position and a deployed position, the manual pull including a first locking member proximate the actuator connector at the manual pull second end;

the operating handle coupled to the manual pull proximate the manual pull first end;

a second locking member mounted to the actuator case top portion and partially projecting within the actuator case interior channel, the second locking member selectively engageable with the first locking member;

the transfer shaft extending longitudinally from a first end to a second end, each of the transfer shaft first and second ends rotationally coupled to the rigid frame, the transfer shaft defining a transfer shaft rotation axis;

the leg pull cam mounted eccentrically to and rotatable with the transfer shaft about the transfer shaft rotation axis, the eccentricity defining a long cam axis and a short cam axis, the leg pull cam including a curved outer engagement surface extending from the cam long axis to the cam short axis, the outer engagement surface including a leg pull cam channel, the leg pull cam mounted to the transfer shaft with the long cam axis oriented away from the actuator flexible connector block;

the first transfer shaft pulley mounted concentrically around and rotatable with the transfer shaft about the transfer shaft rotation axis;

the actuator flexible connector extending from a first end connected to the actuator connector within the actuator case interior channel to a second end operably connected to the leg pull cam proximate the long cam axis, the actuator flexible connector routed from the actuator case through the actuator case lower portion bushing hole and through the actuator flexible connector block and along the leg pull cam outer engagement surface within the leg pull cam channel;

the first leg assembly comprising a first leg hinge portion, a first leg shaft, a first leg bias spring, a first leg bias spring holder, and a first leg bias spring connector;

the first leg hinge portion including a first leg hinge outer surface with first and second engagement channels extending around at least a portion of the first leg hinge portion outer surface, a first leg hinge portion axle and a first leg shaft receiver including a first leg shaft receiver interior, the first leg hinge portion first channel in communication with the first leg hinge portion shaft receiver interior, the first leg hinge portion rotatably coupled to the frame first leg hinge case at the first leg hinge portion axle to rotate between a stowed position and a deployed position, the first leg hinge portion axle defining a first leg hinge portion rotation axis;

the first leg shaft extending longitudinally from a first leg shaft first end to a first leg shaft second end, the first leg shaft coupled to the first leg shaft receiver proximate the first leg shaft first end, the first leg shaft including a first leg bias spring chamber;

the first leg bias spring extending from a first leg bias spring first end to a first leg bias spring second end, the first leg bias spring slidingly disposed within the first leg bias spring chamber with the first leg bias spring first end proximate the first leg shaft first end;

the first leg bias spring holder slidingly disposed within the first leg bias spring chamber proximate the first leg bias spring second end; and, the first leg bias spring connector extending from a first end to a second end, the first leg bias spring connector first end fixedly attached to the frame proximate the first leg assembly hinge case, the first leg bias spring connector second end attached to the first leg bias spring holder, the first leg bias spring connector routed within the first leg hinge portion first channel and through the first leg receiver and first leg bias spring chamber, wherein when the first leg hinge portion rotates between a stowed position and a deployed position the first leg bias spring holder compresses the first leg bias spring within the first leg bias spring chamber and when the first leg hinge portion rotates between a deployed position and a stowed position the first leg bias spring holder allows the first leg bias spring to decompress;

the first leg flexible connector extending from a first end to a second end, the first leg flexible connector first end operably connected to the first transfer shaft pulley and the first leg flexible connector second end operably connected to the first leg hinge portion, the first leg flexible connector routed within the first leg hinge portion second engagement channel;

wherein, moving the actuator manual pull between the stowed position and the deployed position causes the actuator flexible connector to rotate the leg pull cam and causes synchronous rotation of the transfer shaft and first transfer pulley about the transfer shaft rotation axis, and further causes the first leg hinge portion to synchronously rotate about the first leg hinge portion rotation axis between a stowed position and a deployed position.

18. The portable stand as in claim 17, further comprising:

the rigid frame further including a plurality of leg assembly hinge cases each corresponding to one of a plurality of leg assemblies;

a plurality of leg assemblies, each leg assembly rotationally mounted to a corresponding one of the rigid frame members;

a plurality of transfer shaft pulleys, mounted concentrically around and rotatable with the transfer shaft about the transfer shaft rotation axis, each of the transfer shaft pulley corresponding to one of the plurality of leg assemblies;

a plurality of leg flexible connectors, each of the leg flexible connectors coupling one of the plurality of leg assemblies to a corresponding transfer shaft pulley to synchronously couple each of the plurality of leg assemblies to the transfer shaft;

a plurality of leg flexible connectors, each of the plurality of leg flexible connectors synchronously coupling a corresponding leg assembly to the transfer shaft;

wherein, moving the actuator manual pull between the stowed position and the deployed position causes the actuator flexible connector to rotate the leg pull cam and causes synchronous rotation of the transfer shaft and plurality of transfer pulleys about the transfer shaft rotation axis, and further causes each of the plurality of leg hinge portions to synchronously rotate about their respective leg hinge portion rotation axis between a stowed position and a deployed position.

19. The portable stand as in claim 18, further comprising:

a backpack having an internal frame;

wherein the actuator case is attachable to the backpack internal frame.

* * * * *